(12) United States Patent
Ewert et al.

(10) Patent No.: US 11,418,407 B2
(45) Date of Patent: Aug. 16, 2022

(54) PERSONALIZED METHOD AND SYSTEM FOR MANAGING NETWORK PROPERTIES DISPLAYED ON A USER DEVICE

(71) Applicant: LightRiver Software, Inc., Concord, CA (US)

(72) Inventors: Travis Duane Ewert, Highlands Ranch, CO (US); Timothy Alan Nice, Centennial, CO (US); Timothy Wayne Masse, Spring Hill, TN (US); Glenn Alan Johansen, Orinda, CA (US)

(73) Assignee: LightRiver Software, Inc., Concord, CA (US)

( * ) Notice: Subject to any disclaimer, the term of this patent is extended or adjusted under 35 U.S.C. 154(b) by 0 days.

(21) Appl. No.: 17/094,359

(22) Filed: Nov. 10, 2020

(65) Prior Publication Data
US 2022/0150134 A1 May 12, 2022

(51) Int. Cl.
*G06F 17/00* (2019.01)
*H04L 41/22* (2022.01)
*H04L 9/40* (2022.01)
*H04L 41/0813* (2022.01)

(52) U.S. Cl.
CPC .......... *H04L 41/22* (2013.01); *H04L 41/0813* (2013.01); *H04L 63/08* (2013.01); *H04L 63/102* (2013.01)

(58) Field of Classification Search
CPC ..... H04L 41/22; H04L 41/0813; H04L 63/08; H04L 63/102
See application file for complete search history.

(56) References Cited

U.S. PATENT DOCUMENTS

| 7,853,647 | B2 * | 12/2010 | Maes | H04L 65/1046 |
| | | | | 709/224 |
| 7,860,490 | B2 * | 12/2010 | Maes | H04L 51/38 |
| | | | | 455/418 |
| 7,873,716 | B2 * | 1/2011 | Maes | H04L 67/16 |
| | | | | 709/227 |
| 8,032,920 | B2 * | 10/2011 | Maes | H04L 63/20 |
| | | | | 726/1 |
| 8,073,810 | B2 * | 12/2011 | Maes | H04L 63/0807 |
| | | | | 707/602 |
| 8,321,498 | B2 * | 11/2012 | Maes | H04L 63/102 |
| | | | | 726/5 |
| 8,458,703 | B2 * | 6/2013 | Maes | G06F 9/545 |
| | | | | 718/100 |
| 8,533,773 | B2 * | 9/2013 | Maes | G06F 21/6218 |
| | | | | 726/1 |

(Continued)

*Primary Examiner* — Mohammed H Zuberi
(74) *Attorney, Agent, or Firm* — Sterne, Kessler, Goldstein & Fox P.L.L.C.

(57) ABSTRACT

This disclosure relates to methods and systems for personalizing a network management system. For example, the method comprises receiving a user's credentials at a user device and, after validating the user's credentials, the user device receives at least one network element property describing a network element. The user device then displays the received network element property, the individual interface component functions and applications and interface display suited to that network, based on a predetermined display configuration associated with the validated user credentials based on both predetermined permissions as well as user created settings.

20 Claims, 37 Drawing Sheets

(56) References Cited

U.S. PATENT DOCUMENTS

| | | | | |
|---|---|---|---|---|
| 8,676,958 | B1* | 3/2014 | Hendon | H04L 43/0817 709/224 |
| 9,747,141 | B2* | 8/2017 | Caunter | H04W 4/20 |
| 10,547,521 | B1* | 1/2020 | Roy | H04L 43/0817 |
| 2002/0046097 | A1* | 4/2002 | Yoshimine | G06Q 30/0277 705/14.23 |
| 2005/0044502 | A1* | 2/2005 | Fu | H04L 41/22 715/734 |
| 2008/0228919 | A1* | 9/2008 | Doshi | H04L 41/22 709/226 |
| 2009/0132698 | A1* | 5/2009 | Barnhill, Jr. | H04L 12/2809 709/224 |
| 2014/0201642 | A1* | 7/2014 | Vicat-Blanc | H04L 67/1008 715/736 |
| 2017/0235924 | A1* | 8/2017 | Kuehler | G06F 21/6218 726/4 |

\* cited by examiner

| | Alarms<br>FAC EQU NE QOS ALRT MSC SYS | | Configuration | View | PM | Reports | | |
|---|---|---|---|---|---|---|---|---|
| FLAG ▾ | ASSERT TIME ▾ | CLEAR TIME ▾ | STATUS ▾ | TYPE ▾ | ??? ▾ | ??? ▾ | SA ▾ | CIRCUIT ID ▾ | NS |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |

| ID | TIME | TYPE | COMMENT |
|---|---|---|---|
| console | 6/2/2020 2:06:14 | ACK | Reset & Tested Good |
| console | 6/2/2020 2:06:14 | ACK | Replaced Card |
| console | 6/2/2020 2:06:14 | GMT | TEST |

| | | | | | | | | | |
|---|---|---|---|---|---|---|---|---|---|
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |
| ▱⊘☐ | 6/2/2020 2:06:14 | | ALARM | MISC | CR | ??? | NSA | — — — | ⚙ |

| OWNER | SPEED | PORT | STATUS | PORT ID | |
|---|---|---|---|---|---|
| Customer A | 100GBE | 1-1 | OOS | A-100-1 | CLEAR |
| Customer A | 100GBE | 1-2 | OOS | A-100-2 | CLEAR |
| Customer A | 100GBE | 1-3 | OOS-AU | A-100-3 | ⚠ |
| Customer B | 100GBE | 2-1 | OOS-AU | B-100-2-1 | ⚠ |
| Customer B | 100GBE | 2-2 | IS | B-100-2-2 | CLEAR |
| Customer B | 100GBE | 2-3 | IS | B-100-2-3 | CLEAR |
| Customer B | 100GBE | 2-4 | IS | B-100-2-4 | CLEAR |
| Customer B | OTUC4.400G | 4-1 | IS | B-OTL-I4-4-5 | CLEAR |
| Customer C | 400GBE.ODU4 | 3-1 | IS | C-400-3-1-1 | CLEAR |
| Customer C | 400GBE.ODU4 | 3-1 | IS | C-400-3-1-2 | CLEAR |

*FIG. 17*

| OWNER | SPEED | PORT | STATUS | PORT ID | | CROSS CONNECT |
|---|---|---|---|---|---|---|
| Customer A | 100GBE | 1-1 | OOS | A-100-1 | CLEAR | Available |
| Customer A | 100GBE | 1-2 | OOS | A-100-2 | CLEAR | Available |
| Customer A | 100GBE | 1-3 | OOS-AU | A-100-3 | ⚠ | Connected 3/1/20 at 02:00 ••• |
| Customer B | 100GBE | 2-1 | OOS-AU | B-100-2-1 | ⚠ | Connected 3/9/20 at 22:00 ••• |
| Customer B | 100GBE | 2-2 | IS | B-100-2-2 | CLEAR | Connected 1/1/20 at 12:00 ••• |
| Customer B | 100GBE | 2-3 | IS | B-100-2-3 | CLEAR | Approval Pending Requested 3/1/20 ••• |
| Customer B | 100GBE | 2-4 | IS | B-100-2-4 | CLEAR | Approval Pending Requested 3/9/20 ••• |
| Customer B | OTUC4.400G | 4-1 | IS | B-OTL-I4-4-5 | CLEAR | Connected 1/1/20 at 05:00 ••• |
| Customer C | 400GBE.ODU4 | 3-1 | IS | C-400-3-1-1 | CLEAR | Connected. Sub-rate: 2/17/20 at 07:00 ••• |
| Customer C | 400GBE.ODU4 | 3-1 | IS | C-400-3-1-2 | CLEAR | Connected. Sub-rate: 2/14/20 at 09:00 ••• |

FIG.19-1

| OWNER | SPEED | PORT | STATUS | PORT ID | |
|---|---|---|---|---|---|
| Customer B | 100GBE | 6-3 | OOS-AU | B-100-6-3 | ⚠ |
| Customer D | 100GBE | 12-2 | OOS-AU | D-100-12-1 | |
| Customer C | 100GBE | 8-2 | IS | C-100-8-2 | ⚠ |
| Customer D | 100GBE | 4-1 | OOS-AU | D100-4-1 | CLEAR |
| Customer C | 100GBE | 4-2 | OOS-AU | C-100-4-2 | CLEAR |
| Customer C | OTUC4.400G | 9-1 | IS | C-OTU4-9-1 | CLEAR |
| Customer A | 100GBE | 6-1 | IS | A-100-6-1 | CLEAR |
| Customer D | 100GBE | 12-3 | IS | D-100-12-3 | CLEAR |

*FIG.19-2*

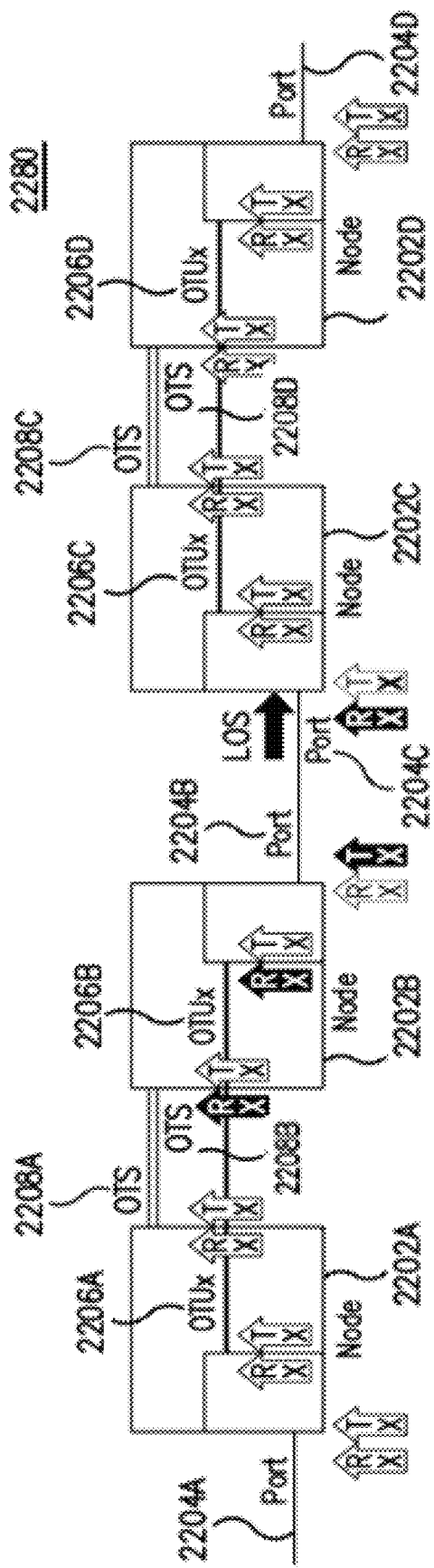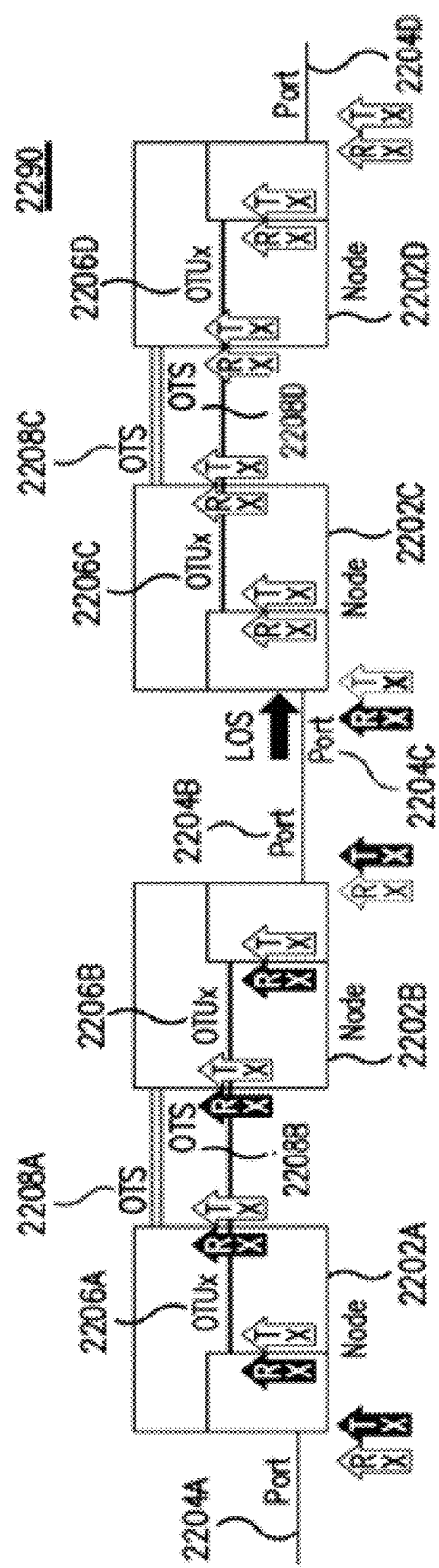
FIG. 22D
FIG. 22E

PERSONALIZED METHOD AND SYSTEM FOR MANAGING NETWORK PROPERTIES DISPLAYED ON A USER DEVICE

FIELD OF INVENTION

This application generally relates to network management systems and methods.

BACKGROUND

Software-defined networking (SDN) technology is an approach to network management that enables dynamic, programmatically efficient network configuration to improve network performance and monitoring, making it more like cloud computing than traditional network management. SDN is meant to address the fact that the static architecture of traditional networks is decentralized and complex while current networks require more flexibility and easy troubleshooting.

A Wide Area Network (WAN) is a network that generally covers long distances. Software Defined Wide Area Network (SD-WAN) is an acronym where SDN performs overlay processing and control for managing a WAN. That is, an SD-WAN network can be a specific application of software-defined networking (SDN) technology applied to WAN connections, which are used to connect enterprise networks over geographic distances.

In a typical SD-WAN Network, the quality of data transmission paths is continuously monitored by a centralized controller to detect data transmission loss, latency, jitter, and other performance metrics. The detected metrics can be used to select possible transmission paths for routing network traffic and can be used to provide troubleshooting capabilities.

Optical transport networking (OTN) is an industry standard for efficient transmission of data over different light paths. OTN operates primarily at the OSI physical layer. It provides a mechanism for circuits to be multiplexed at different wavelengths of light. The data can be any type of network traffic including multimedia services, mobile applications, social media, VoIP, and cloud computing.

To transmit data, an optical transport network includes a set of Optical Network Elements (ONE) connected by optical fiber links, able to provide functionality of transport, multiplexing, switching, management, supervision and survivability of optical channels carrying client signals. Each ONE may re-time, re-amplify, or re-shape photonic light signals from the optical fiber links.

OTN wraps payloads from various clients into a container for transport across optical networks, preserving the clients' native structure, timing information, and management information. The enhanced multiplexing capability of OTN allows different traffic types—including Ethernet, storage, and digital video, as well as SONET/SDH—to be carried over a single Optical Transport Unit frame. These OTN and other transport network technologies comprise both backbone transmission and can extend into data centers and directly to homes and businesses. Data centers are facilities where the equipment is located and can include Central Offices.

Typically, the general condition of the OTN is monitored. A monitor is often placed at a location within the network, including for example, an ONE. The monitor remotely monitors, e.g., from the ONE, the general condition of the optical fiber network.

Problem detection in networks is conventionally implemented only after a failure has occurred or when some other fault has been detected. When failures occur, optical time domain reflectometry ("OTDR") is typically used for inspecting a single fiber. A short pulse of light is transmitted into a fiber using an OTDR device. The light pulse is monitored in the fiber using the OTDR device for abrupt changes indicative of a fault in the fiber. In a typical OTN, because the light pulse often splits and propagates to all branches, the detected light is contributed from all branches. Thus, even when a fault is detected, it is difficult, expensive, and time-consuming to find a specific faulty branch fiber. Meanwhile, the providers and customers suffer.

Currently, network providers and customers alike have limited visibility of the performance conditions that affect their data transportation. In current systems private network customers may be able to monitor specific network elements on a point-by-point basis, but they are unable to monitor their own private network from end to end nor are they able to monitor specific partitioned networks and/or services associated with the network elements along the end-to-end path. Not only is the visibility limited or non-existent, but the data can be overwhelming to an untrained eye. These and other issues prevent providers from realizing the full potential of their data networks and similarly prevent customers from accessing critical data and self-serve access to their private networks.

Improved methods for monitoring end-to-end networks and/or services, including partitioned and disaggregated networks and/or services, and distributing real-time network properties to customers, in a user-friendly way, are needed.

BRIEF SUMMARY

Embodiments relate to improved network management, including disaggregated networks and optical physical layer networks. A distributed optical network management system is provided for allowing a user of an optical transport network to access the properties of the optical transport network. The system includes an optical transport network made up of optical network elements interconnected by optical fibers. The system also includes an inventory database that specifies how the optical network elements provide a network service at the wavelength level of the optical fibers. The system also includes a user database that specifies which user is provided the foregoing network services. The system also includes a controller that, among other things, retrieves properties and data describing network circuits associated with a specific user (i.e., customer, operator, technician, etc.) and then output the retrieved properties to a user device.

Further embodiments, features, and advantages of the invention, as well as the structure and operation of the various embodiments, are described in detail below with reference to accompanying drawings.

BRIEF DESCRIPTION OF THE DRAWINGS

The accompanying drawings are incorporated herein and form a part of the specification.

FIG. 10 shows an exemplary alarm application display and interface.

Figure 12:
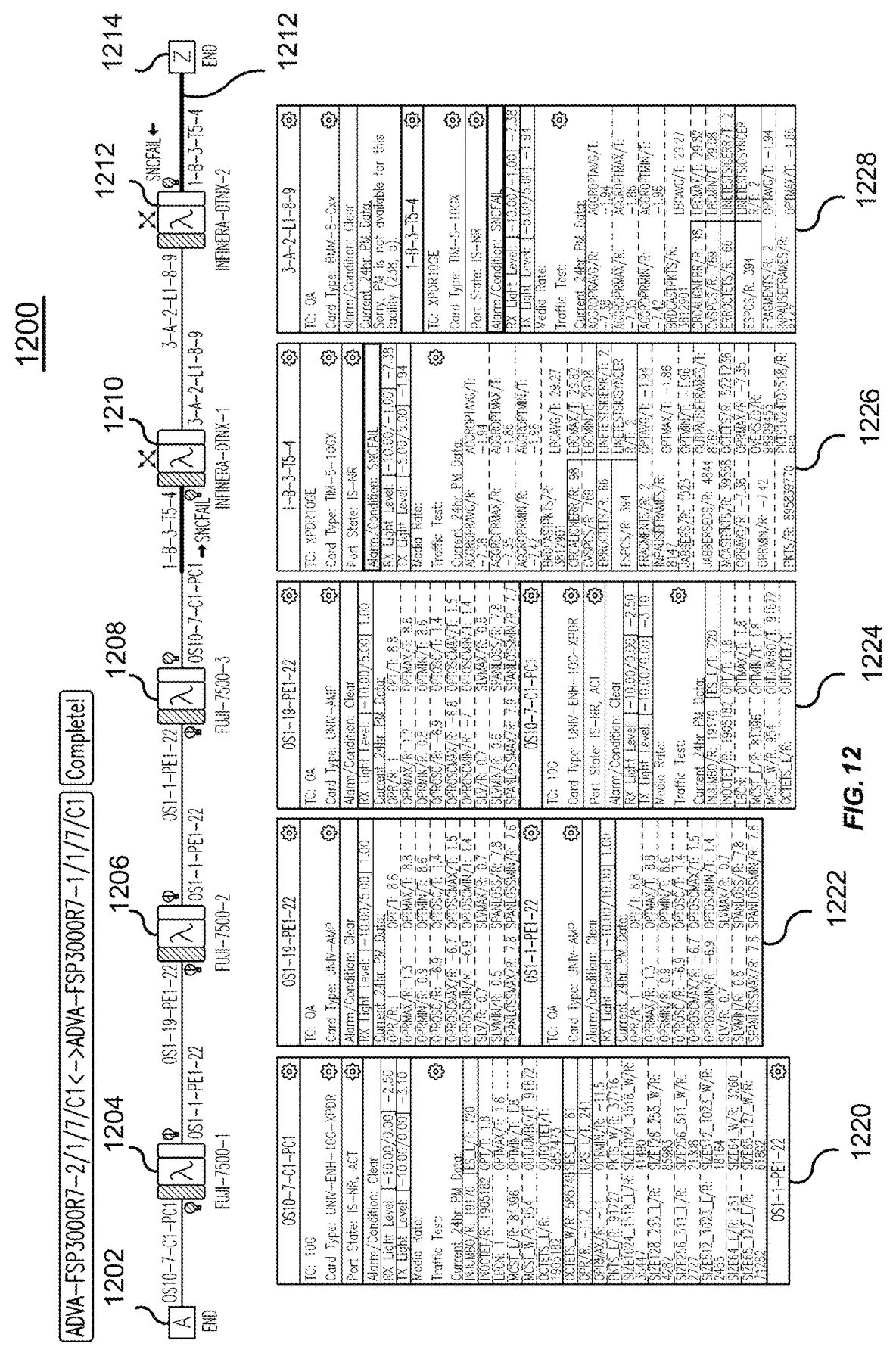

FIG. 12 shows an interface for reviewing diagnostics of a network service in an optical transport network, according to an embodiment.

FIGS. 16-1 and 16-2 show an exemplary capacity reservation application display and interface.

FIG. 17 shows an exemplary sales insight application display and interface.

FIGS. 19-1 and 19-2 show exemplary SD-WAVES connection application displays and interfaces.

FIGS. 22A-E illustrate an example of a optical transport network, according to an embodiment.

DETAILED DESCRIPTION

Embodiments providing improved systems and methods for monitoring and troubleshooting communications networks, including optical physical layer networks, in a user-friendly way, are needed.

Embodiments provide various methods to monitor network elements, display the observed data in a user-friendly manner, isolate problems in a data network, including an optical transport network, and in embodiments, automatically perform a remedial action. These and other embodiments are described with respect to the figures below.

Figure 1:
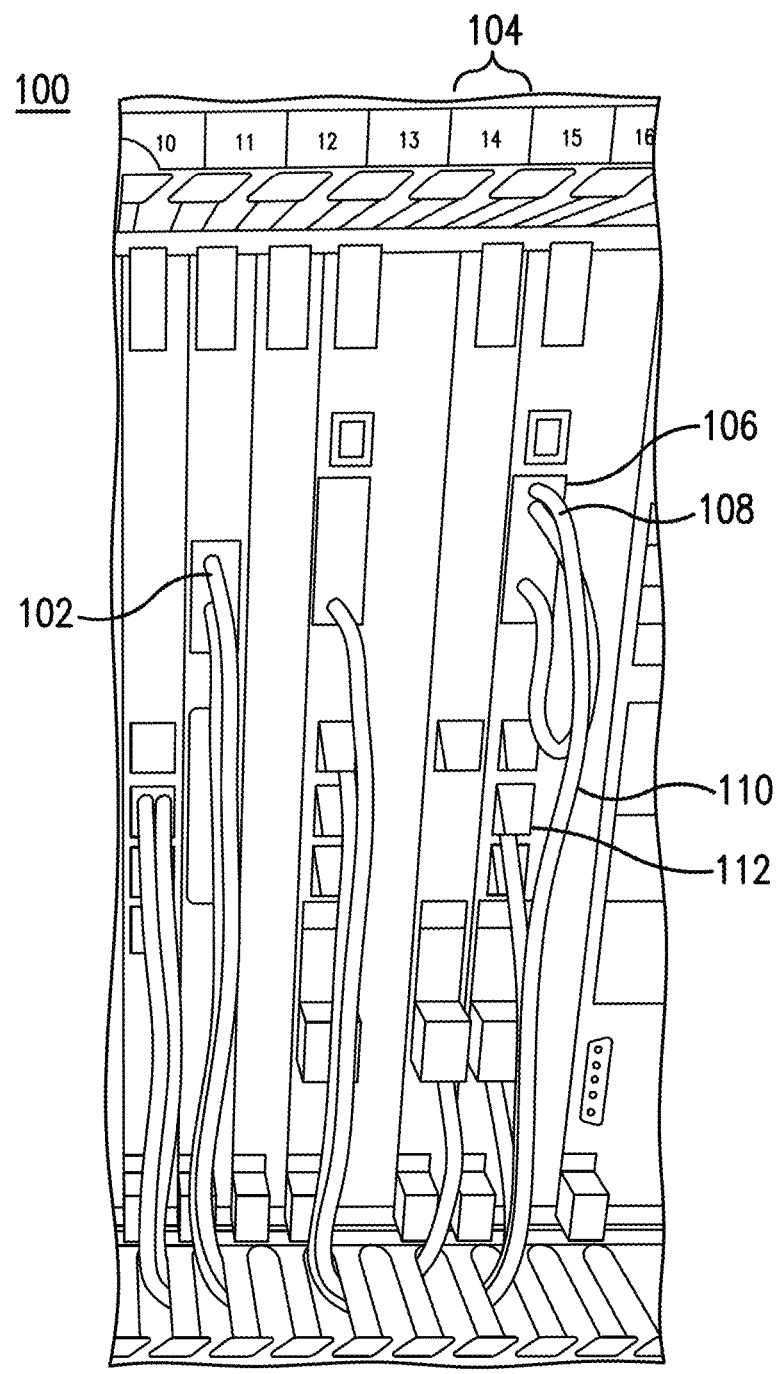
FIG. 1 is a diagram of an optical transport network, according to an embodiment.

FIG. 1 is a diagram of an exemplary optical transport network apparatus 100 that may be used in accordance with the systems and methods described herein. Optical transport network apparatus 100 includes a plurality of optical network elements, such as optical network element 104. Each optical network element 104 can be from a different vendor and can have one or more optical interfaces, such as optical interfaces 102 and 106. Connected to the optical interfaces 102 and 106 are optical fibers, such as optical fibers 108 and 110. Each of these components are discussed below.

The plurality of optical network elements may each be inserted into a slot of the optical transport network apparatus 100. The plurality of optical network elements can include an optical add/drop multiplexer, optical network interface cards, optical amplifiers, or optical switches. While aspects of this disclosure are shown for optical transport networks, a skilled artisan would recognize they can be applied to other types of transport networks and physical-layer transport networks.

An optical add-drop multiplexer (OADM) is a device used in wavelength-division multiplexing systems for multiplexing and routing different channels of light into or out of a single mode fiber (SMF). "Add" and "drop" here refer to the capability of the device to add one or more new wavelength channels to an existing multi-wavelength WDM signal, and/or to drop (remove) one or more channels, passing those signals to another network path. An OADM may be considered to be a type of optical cross-connect.

An optical network interface card may convert electrical signals into optical signals or may convert optical signals of other protocols into an optical transport network protocol. They may interact with user premises devices. It may take user data and wrap it with an OTN header and forward error correction information. An example of an optical network interface cards includes an optical supervisory channel module.

An optical amplifier is a device that amplifies an optical signal, perhaps directly, without the need to first convert it to an electrical signal. These devices are used to compensate optical signal attenuation caused by fibers and components, to increase optical transmission distance. An example may be an Erbium-Doped Fiber Amplifier.

As described above, the plurality of optical network elements are connected with optical fibers. Within a data center, the optical fibers may be patch cords. An optical fiber is a flexible, transparent fiber made by drawing glass (silica) or plastic to a narrow diameter. Optical fibers are used most often as a means to transmit light between the two ends of the fiber. The light is transmitted between the two ends of the fiber using a specific wavelength or wavelengths of light.

Figure 2:
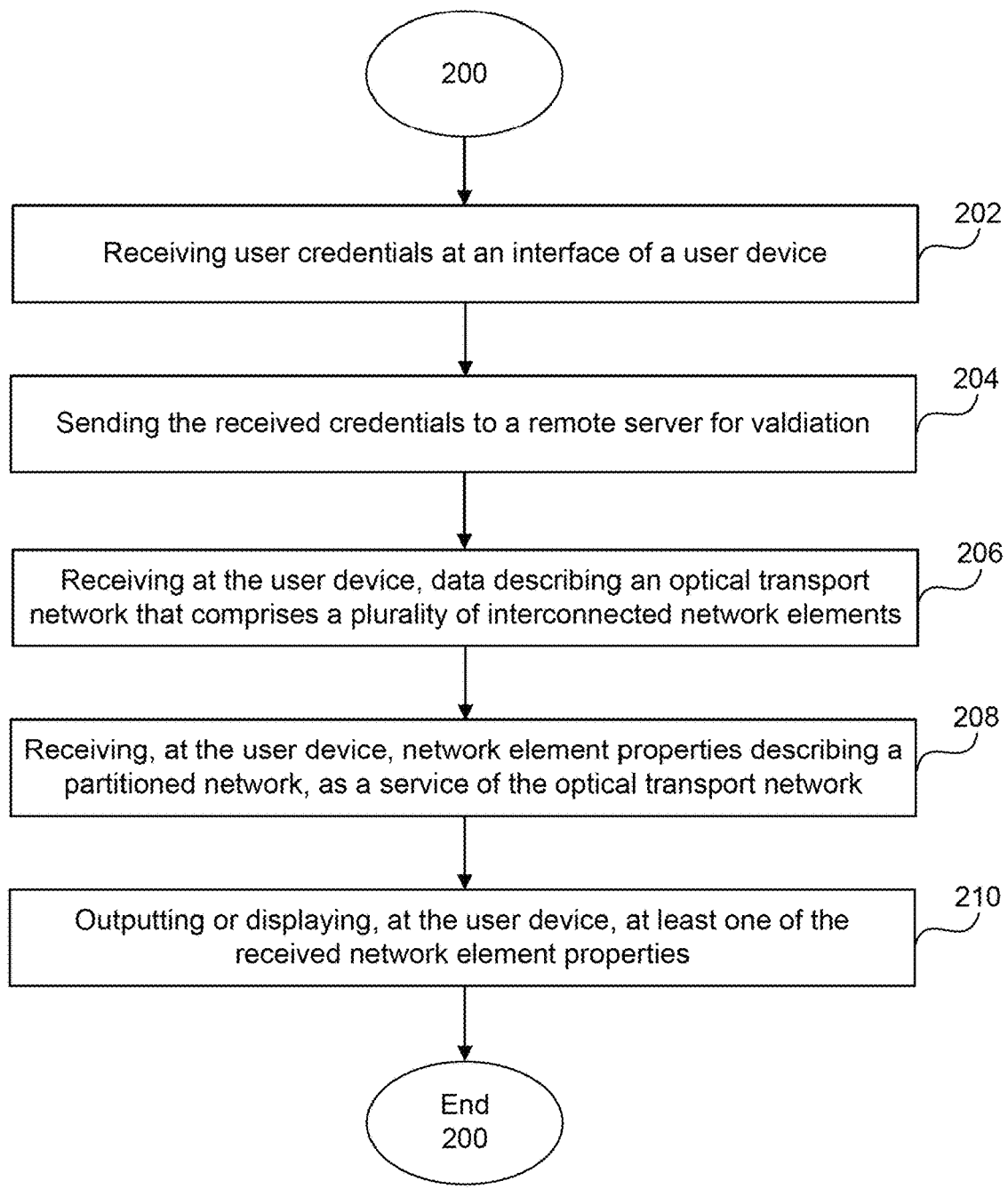
FIG. 2 illustrates an exemplary method for accessing optical transport network properties in a distributed optical transport network system.

FIG. 2 illustrates an exemplary method 200 for accessing optical transport network properties in a distributed optical transport network system, including properties describing a wavelength of the optical transport network. Method 200 begins at step 202, by receiving credentials at an interface of a user device.

Receiving the credentials may involve receiving user input such as, for example a username and password, on a keyboard or touchscreen. In embodiments, the credentials may include a PIN number, a security token, a code word, or any other typical methods for identifying a particular user. The user input may also involve using a specific physical object such as a smart phone, smart card, USB drive, RFID chip, keys, or token devices. In sum, the user credentials are used to authenticate or validate the user attempting to manage the network properties. In an embodiment, step 202 may be conducted using a login/authentication application operating on a user device.

As used herein, a user may be a service provider, an employee of a service provider, or anyone that conventionally works on, troubleshoots, or monitors a service provider's data network. A user may also be a customer, including individuals, companies, or sub-providers. In short, a user may be anyone that has a stake in the network's performance.

As used herein, network services are based on the Open Systems Interconnection model (OSI model) and point-topoint, multi-point, or meshed networks to include, but not limited to, Optical Wavelengths, Synchronous Optical Network (SONET), Ethernet, Multiprotocol Label Switching (MPLS), Virtual Local Area Network (VLAN), Internet Protocol Virtual Private Network (IP-VPN), Internet Protocol Security (IP-Sec), and others.

As used herein, a user device may be any electronic device capable of receiving user input (e.g., via a user interface), communicating with a remote server, and displaying network property data. For example, in embodiments, the user device may include a computer, a tablet, a smartphone, a gaming system, a smart watch, a television, an augmented reality device, or a virtual reality device. In additional embodiments, more than one of the foregoing user devices may be used to manage the network properties.

At step 204, the user device sends the user credentials to a remote server for authentication or validation. In an embodiment, the authentication or validation may occur at the user device. That is, the device may authenticate or validate the user without sending the user credentials to a remote server. The user device and/or remote server uses the credentials to determine the user's identity and to determine which network data the user has permission to view, access, and/or manage.

At step 206, the user device receives data describing an optical transport network, including a plurality of interconnected network elements. In an embodiment, the received data may include information describing, for example, optical transport network apparatus 100 and its various elements. Step 206 may further comprise determining an inventory, that is, a complete database of all the circuits, connections, ports, and cards on the optical transport network (e.g., inventory database 436, illustrated in FIG. 4). In an embodiment, the data received at step 206 only includes data that the user is allowed to see based on the authenticated or validated credentials of step 204.

Figure 4:
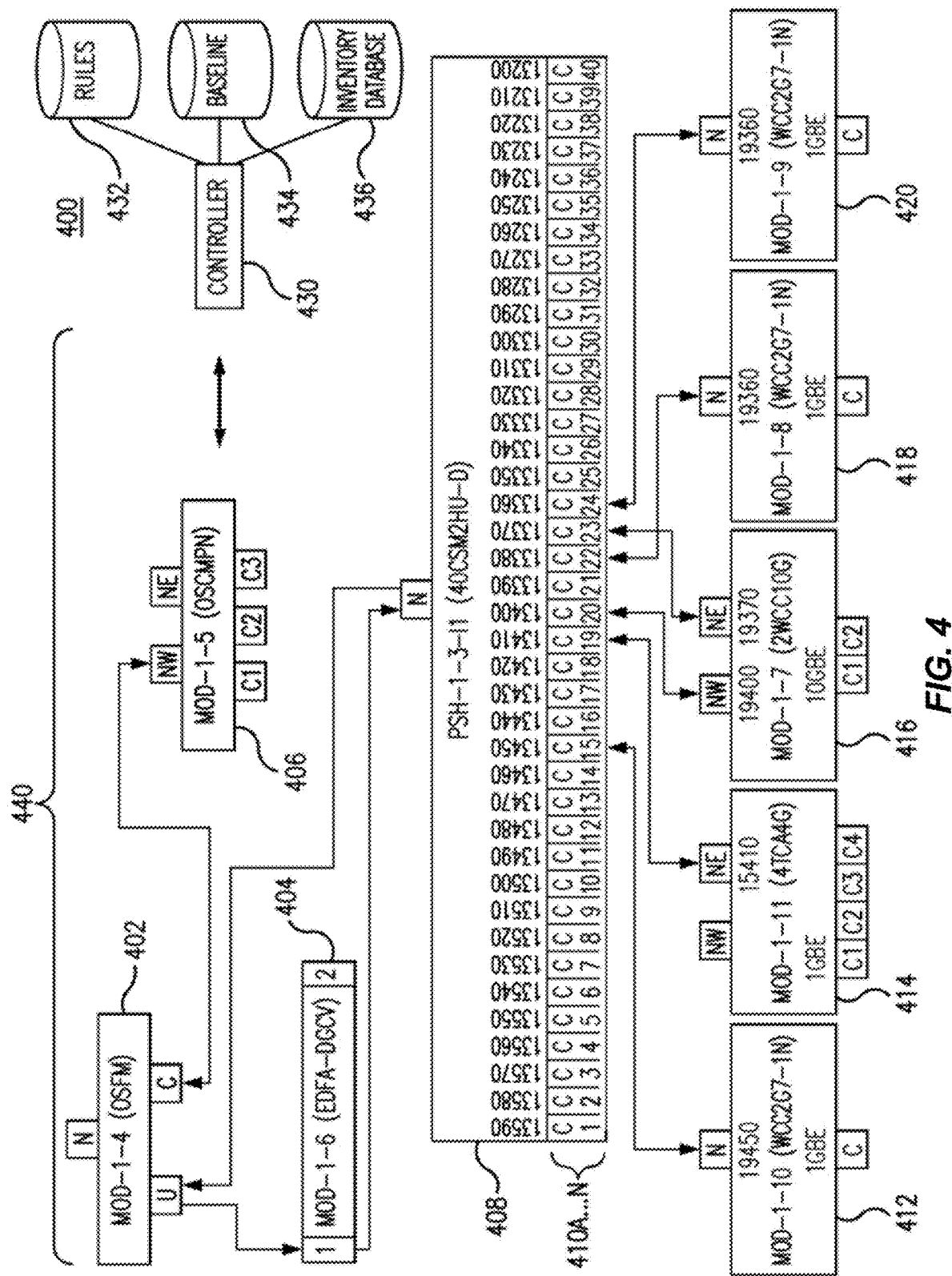
FIG. 4 shows an example of an inventory discovered from an OTN network element and how various cards can be connected together, according to an embodiment.
Figure 5:
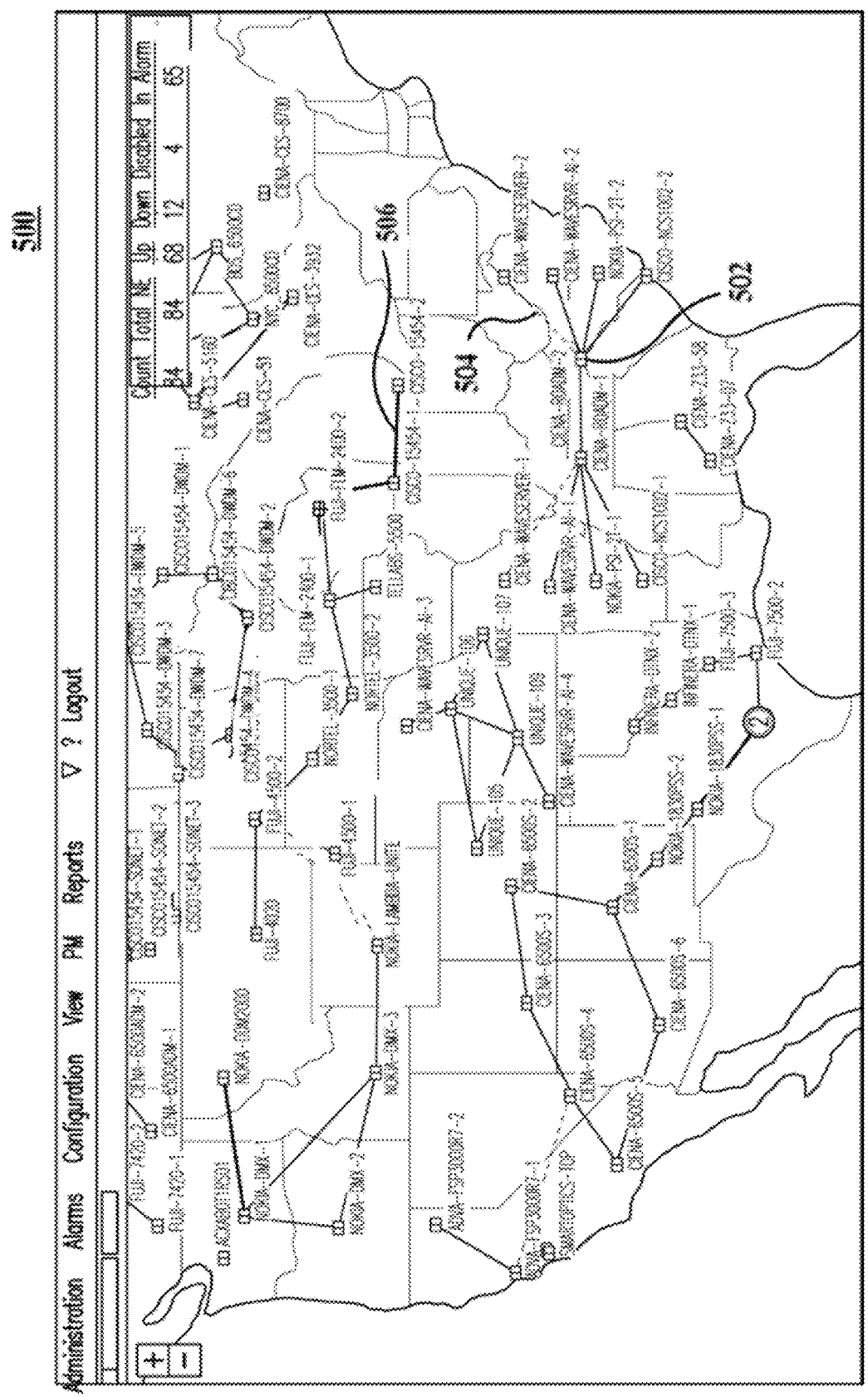
FIGS. 5 and 6A-C show multiple optical transport networks, legacy and next-generation, monitored by a controller, according to an embodiment.

In an embodiment, step 206 may use a controller, such as controller 430 illustrated in FIG. 4, to log into each optical network element and may discover, for example, each card, each port, each circuit, each wavelength, how each port is wired to one another, from node to node (ONE to ONE), and/or which wavelengths are being used within a specific partitioned network or under a specific service. For example, the controller may discover that port one of node one will go to port two of node two and so on.

To communicate with the optical network elements, different command sets may be used depending on a type of the network element. The different command sets may be implemented in different resource adapters. Each resource adapter is configured to implement the desire functionality of the controller in one of various network command languages. The network command languages include, but are not limited to, Transaction Language 1 (TL1), Simple Network Management Protocol (SNMP), command-line interface (CLI), and NETCONF/YANG.

After determining all the connections in the OTN, the controller may discover network properties of the independent connections, including properties describing the physical layer (i.e., wavelength-level). As data is transported over the network, performance data may be collected from the various optical network elements. For example, at step 208, the user device receives network property data describing a partitioned network, as a service of the optical transport network. In an embodiment, the network property data may include data describing a wavelength of the optical transport network.

As used herein, network property data includes performance characteristics of a specific wavelength and/or properties associated with a specific wavelength, such as: a network element ID, a map view of the distributed optical network, a global position, a network location, a table describing a usage, a table describing network elements associated with the at least one entity, optical network system trace information of the at least one wavelength, a switch number, a line identification, a port number, a total bandwidth usage, bandwidth limitations, a light level, a number of packets received, a number of packets sent, an alarm status, circuit analysis data, a remaining capacity, bit error rate (BER), throughput, latency, errored seconds, severely errored seconds, unavailable seconds, number of coding violations (errors), forward error corrections, uncorrectable block errors, jitter, and/or any other characteristics describing network performance or an identification property. The resource adapters described above can be used to collect the performance data from different types of ONEs.

At step 210, the user device displays the network property data received in step 208 based on the authenticated and/or validated user credentials. As will be described in greater detail below, the network property data may be displayed using a predetermined display configuration based on, for example, a user's previously specified preference, a user's task or job function (e.g., an executive, a sales representative, a capacity manager, a network operations center engineer, etc.), based on a preset and/or default configuration, and/or based on the specific partitioned network and related services.

Figure 3:
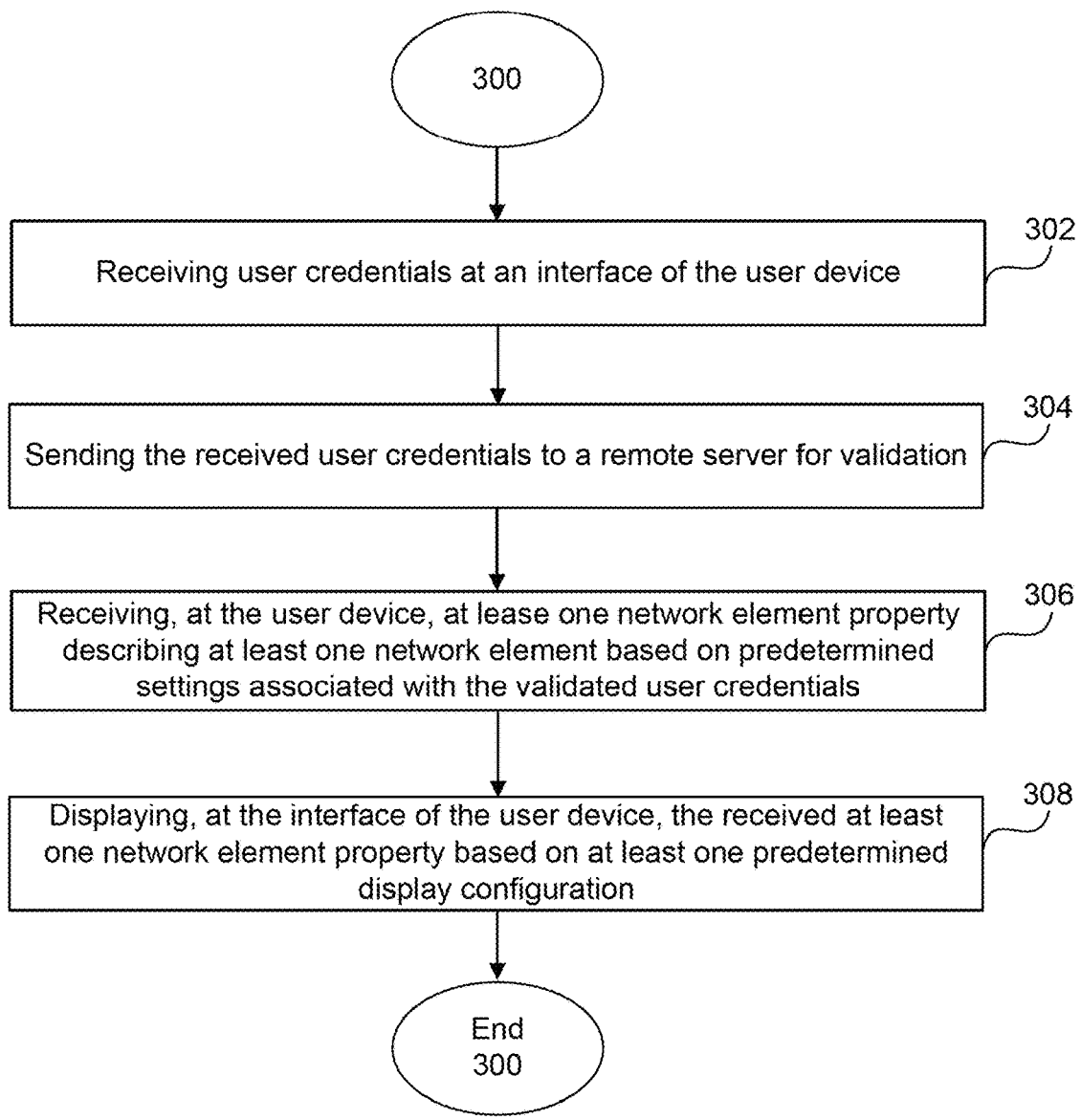
FIG. 3 illustrates an exemplary method for displaying at least one network element property on a user device.

FIG. 3 illustrates an exemplary method 300 for managing network properties displayed at a user device. Method 300 begins at steps 302 and 304 which are substantially similar to steps 202 and 204 illustrated in FIG. 2, as described above. While FIG. 2 is primarily directed to an OTN, method 300 may be implemented on any data network using one or more transport technologies, including 5G, wavelength-division multiplexing (WDM), optical transport network (OTN), data center interconnect (DCI), synchronous optical network (SONET), Ethernet, virtual private network (VPN), and software-defined networking in a wide area network (SD-WAN). In embodiments, methods 200 and 300 may be used in a disaggregated network, which is defined above as a network including network elements from one or more manufacturers, providers, or technological generations that are configured to communicate with and/or exist on network components from another manufacturer, provider or technological generation.

At step 306, the user device receives network properties describing a network element, or elements, based on predetermined settings associated with the user credentials validated or authenticated in step 304. As described above, network property data includes a network element ID, a map view of the distributed network, a global position, a network location, a table describing a usage, a table describing network elements associated with the at least one entity, system trace information, a switch number, a line identification, a port number, a total bandwidth usage, bandwidth limitations, a light level, a number of packets received, a number of packets sent, an alarm status, circuit analysis data, a remaining capacity, or any other characteristics describing network performance or an identification property.

At step 308, the user device displays the received network properties based on a predetermined display configuration. In embodiments, the network property data may be displayed using a predetermined display configuration based on either a user's previously specified preference, a user's task or job function (e.g., an executive, a sales representative, a capacity manager, a network operations center engineer, etc.), or based on a preset and/or default configuration.

In an embodiment, the network property data may be displayed using an application or an application programming interface (API). The application or API may display the network property data (also referred to herein as performance data) using (e.g, at step 210 illustrated in FIG. 2), for example, a table format, a graph, an image, a map format, a graphical user interface (GUI), or a combination thereof. In embodiments, the network property data is displayed in multiple separate windows. Alternatively, the data may be layered within the same window.

As explained above, methods 200 and 300 (illustrated in FIGS. 2 and 3, respectively) both include a step for receiving network properties and performance information. FIG. 4 shows a non-limiting system 400 for monitoring performance of an optical transport network, according to an embodiment. System 400 includes an example of one optical transport network element shelf 440 connected to a controller 430, which is coupled to various databases: rules database 432, performance baseline 434, and inventory database 436.

Optical transport network element shelf 440 includes a plurality of optical hardware connected by fiber patch cords. The plurality of optical hardware includes:

Optical supervisory channel modules 402 and 404, which enhance optical layer functionality with out-of-band signaling in a communications and control channel. Optical supervisory channel modules 402 and 404 may provide remote site alarm reporting, communication necessary for fault location.

Erbium-doped fiber amplifier (EDFA) 404, which is an optical repeater device that is used to boost the intensity of optical signals being carried through a fiber optic communications system.

Multiplexer 408, which takes signals from various channels 410A . . . N and combines them on different wavelengths and a single beam of light.

Optical transponders 412, 414, 416, 418, and 420 send and receive optical signals at particular data rates. They may support 3R operations (reshaping, re-timing and re-generating) at unsupported rates.

Controller 430 may execute, for example, the operations described above in methods 200. In an embodiment, controller 430 can be implemented in a separate appliance, close to the optical transport network, or in the same data center as the OTN. Controller 430 could also be installed on one or more of the optical network elements. Controller 430 could also be installed on a Data Center Interconnect box. Finally, controller 430 could be installed on a different data center through a secure, cloud-based connection. In an embodiment, controller 430 may be installed or deployed on a dedicated server, a virtual machine, a container, in a private or public cloud datacenter location, or it could be a resident as a dedicated application within a network element.

Baseline database 434 stores a snapshot of optical network 440's performance before or soon after it entered operation. As described above, the data in baseline database 434 may be calculated based on specifications of optical network element shelf 440. Alternatively, controller 430 can capture the data in baseline database 434 by querying individual optical network elements on optical network element shelf 440.

Rules database 432 stores user-defined rules specifying what actions should trigger under what conditions. The conditions relate to performance information collected by controller 430 and baseline performance information stored in baseline database 434. The conditions specified under what circumstances an action should occur. That is, the conditions may specify a differential or requisite change between baseline performance information in baseline database 434 and runtime performance information collected by controller 430. In addition, rules database 432 can specify what action should occur when the condition is satisfied. As described above, the remedial action could involve notification, ticketing, or an auto remediate functionality. As will be described below, the remedial action could trigger one or more applications to notify a user that a threshold has been met or that a circuit is in an alarm condition. In such embodiments, the threshold may be predefined upon installation or it may be defined by a user, customer, operator, or any other person with appropriate permissions.

Inventory database 436 tracks different customers, their associated network services (e.g., VLAN, Ethernet, Internet, etc.), and the optical network elements used to provide the network services. Inventory database 436 also tracks data describing a circuit and the specific wavelength(s) of the optical fiber that are used to provide the network services. When a new service is added to the inventory database, a provisioning server may push configuration messages to optical network elements in the inventory database. When an existing service is modified, for example, to change a service level, the provisioning server may look to the inventory database to determine which optical network elements to send messages to. In this way, a central provisioning server and inventory database may determine which optical network elements need to be configured.

In an embodiment, the functionality of the inventory database 436, as described above, may be implemented using more than one database. For example, the customer data, the circuit data, and the wavelength data may be stored in different databases. In an embodiment, a user database may specify which users are provided a network service.

As explained above, methods 200 and 300 (illustrated in FIGS. 2 and 3, respectively) both include a step for outputting or displaying a network property on a user device. A number of exemplary embodiments will not be described.

FIGS. 5 and 6A-C show interfaces 500 and 600a-c depicting geographic map embodiments showing a plurality of optical chassis in different data centers throughout the country. While FIGS. 5 and 6A-C illustrate an OTN, additional embodiments provide or display maps depicting disaggregated networks (not shown). As explained above, a disaggregated network may include network elements from one or more manufacturers, providers, technological generations, or transport technologies. For example, the transport technologies may include one or more of 5G, wavelength-division multiplexing (WDM), optical transport network (OTN), data center interconnect (DCI), synchronous optical network (SONET), Ethernet, virtual private network (VPN), and software-defined networking in a wide area network (SD-WAN). The foregoing elements may be configured to communicate with and/or exist on network components from another manufacturer, provider, or technological generation.

Each point, such as points 502 or 602, represents a data center that can have one or more optical network chassis, with one or more optical network elements installed thereon. Connecting the optical network elements within a chassis are patch cords. Additional optical network services can be provisioned from interconnecting fibers between data centers. In an embodiment, the optical network services can be provisioned at the physical layer based on specific wavelengths used to transfer data on the interconnected fibers.

Interfaces 500 and 600a-c illustrate when particular conditions are met. For example, links 504, 506, or 606 between the data centers may change colors indicating potential problems with light levels or other collective performance characteristics.

Task bar 610 may include, for example, buttons or menus that allow user 614 to isolate particular performance data. The buttons and menus may further include options for the user to specify the amount of data, specific types of data, based on a specific job or task. In embodiments, the user-specified format may be modified during a single session and return to a preset and/or default setting at the end of the session. Alternatively, the modified view may be retained for future viewing or until the user further modifies the view. In an embodiment, reports may be customized based on user-specified criteria or based on a preset and/or default configuration based on the user's job function, job title, or any other pre-determined criteria related to the user.

Network elements summary 616 provides a summary of the network elements. In an embodiment, user 614 may select one of the performance characteristics to isolate those characteristics on the map.

Figure 6A:
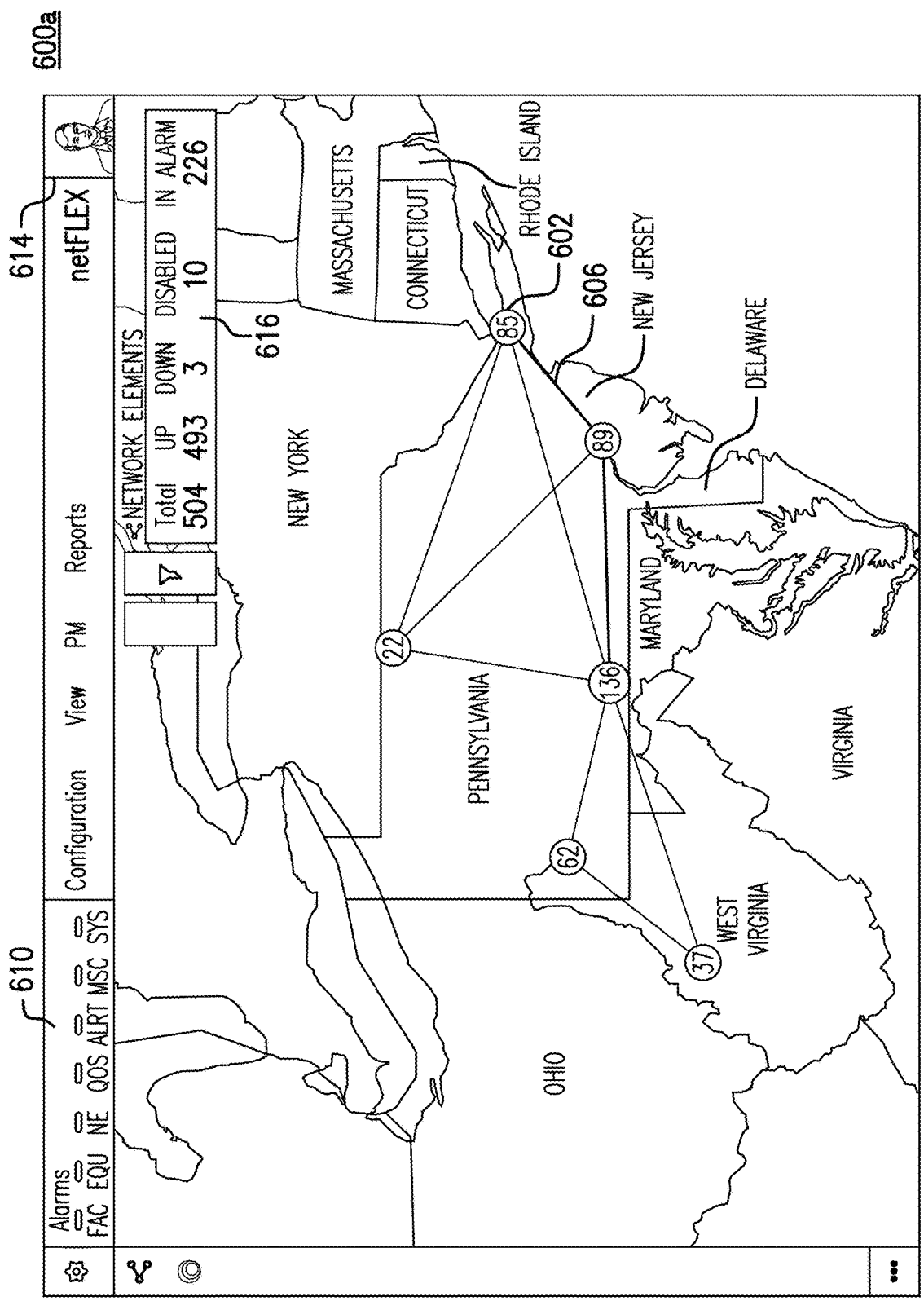
Figure 6B:
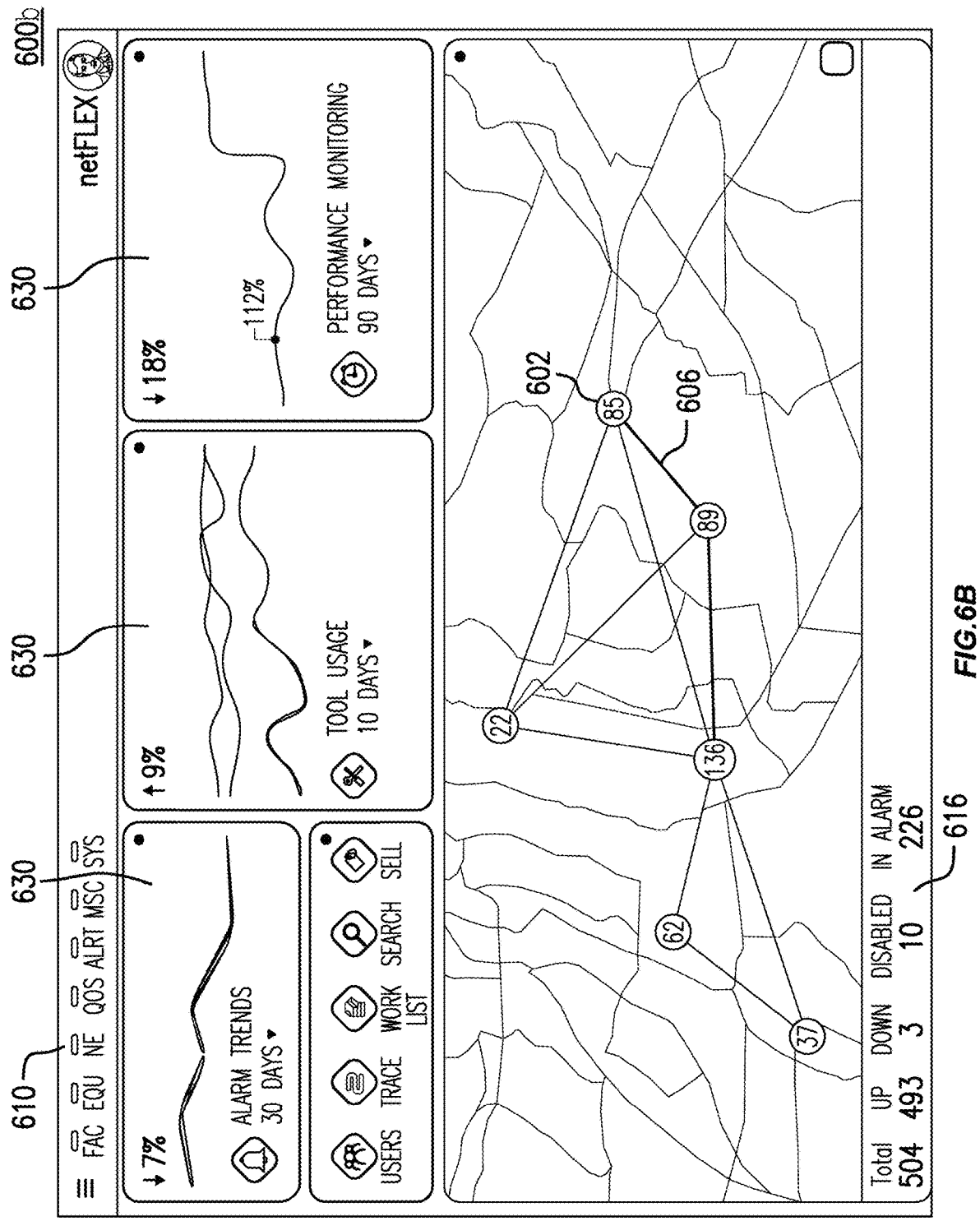
Figure 6C:
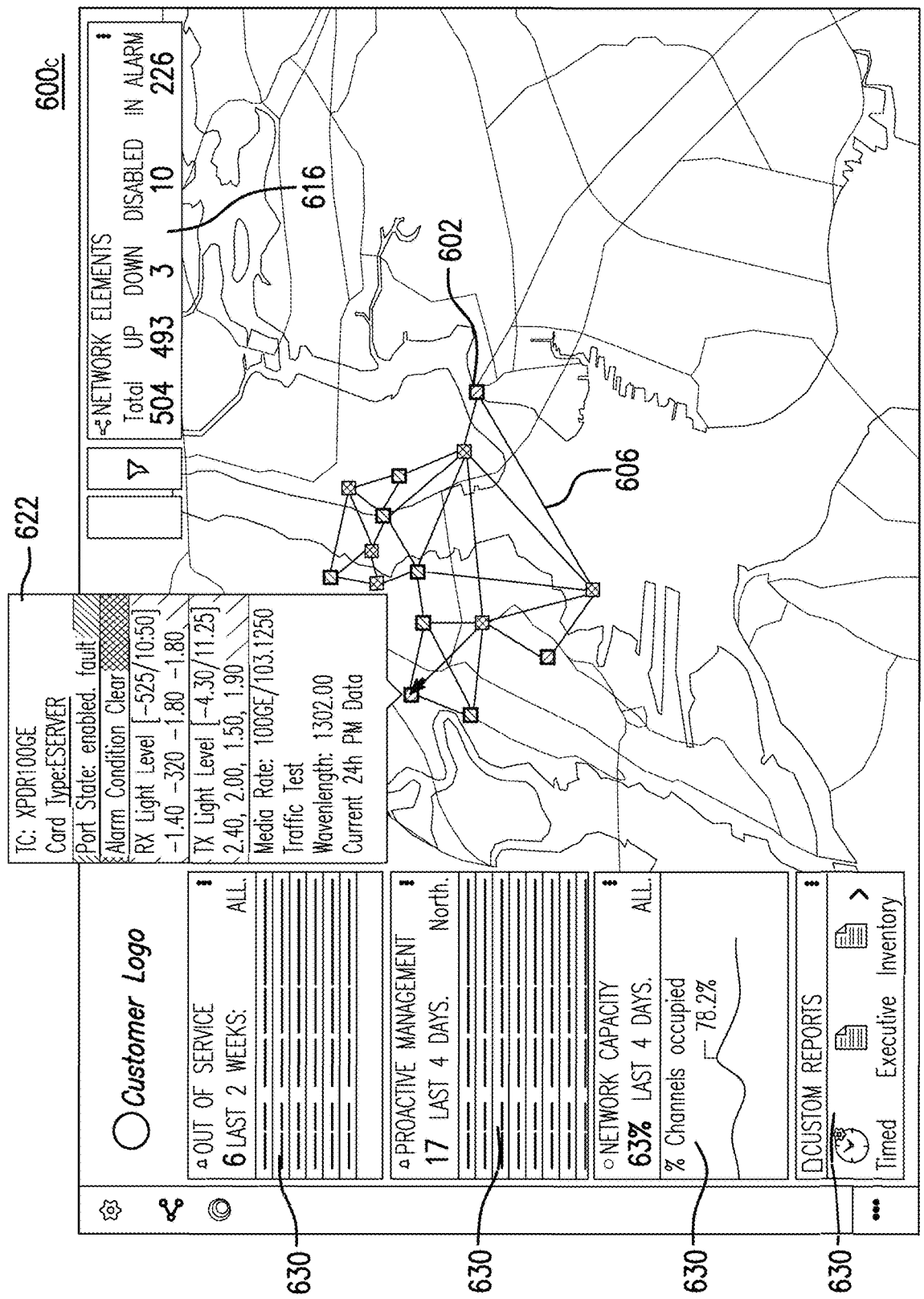

FIGS. 6B-C show applications 630 that provide additional details about the performance characteristics (i.e., network property data) of the network, including properties of a particular wavelength of an optical fiber. In an embodiment, the applications are displayed using an application programming interface (API). The applications or API may present the performance and property data using, for example, a table format, a graph, an image, a map format, a graphical user interface (GUI), or a combination thereof. In embodiments, the data may be displayed in separate windows, as illustrated in FIGS. 6B-C. Alternatively, the data may be layered within the same window.

FIG. 6C shows pop-up window 622, describing a network element's current network element properties, including performance characteristics and other properties. Pop-up window 622 may appear by scrolling over or otherwise selecting point 602.

Figure 7:
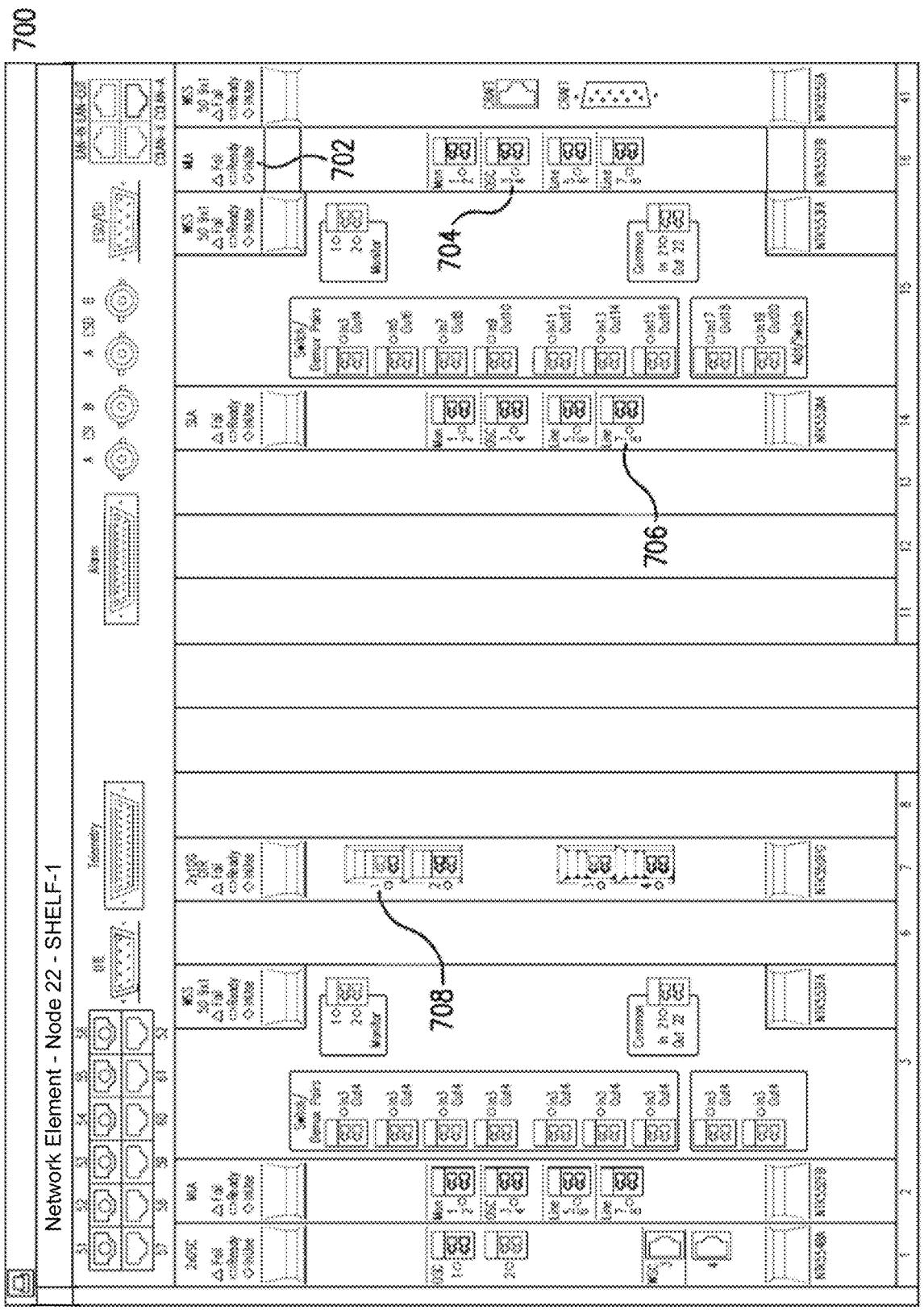
FIG. 7 shows an example of the discovered physical inventory of an OTN node and the interfaces for monitoring performance of an optical transport network, according to an embodiment.

FIG. 7 shows an exemplary interface 700 illustrating various optical network elements within an optical network chassis. The various optical network elements are represented by graphics with ports and colored indications 704, 706, and 708 indicating whether an issue is detected. For example, the colored indicators may indicate whether particular user-defined conditions are met indicating a deviation from a performance baseline (e.g. reduced light levels).

FIGS. 8A-G illustrate an exemplary method for customizing the method for which network property data is displayed on the user device. Even though FIGS. 8A and 8C resemble FIG. 6B and depict an OTN, this method also applies to other transport technologies, including disaggregated networks, which is defined above as a network including network elements from one or more manufacturers, providers, or technological generations.

Figure 8A:
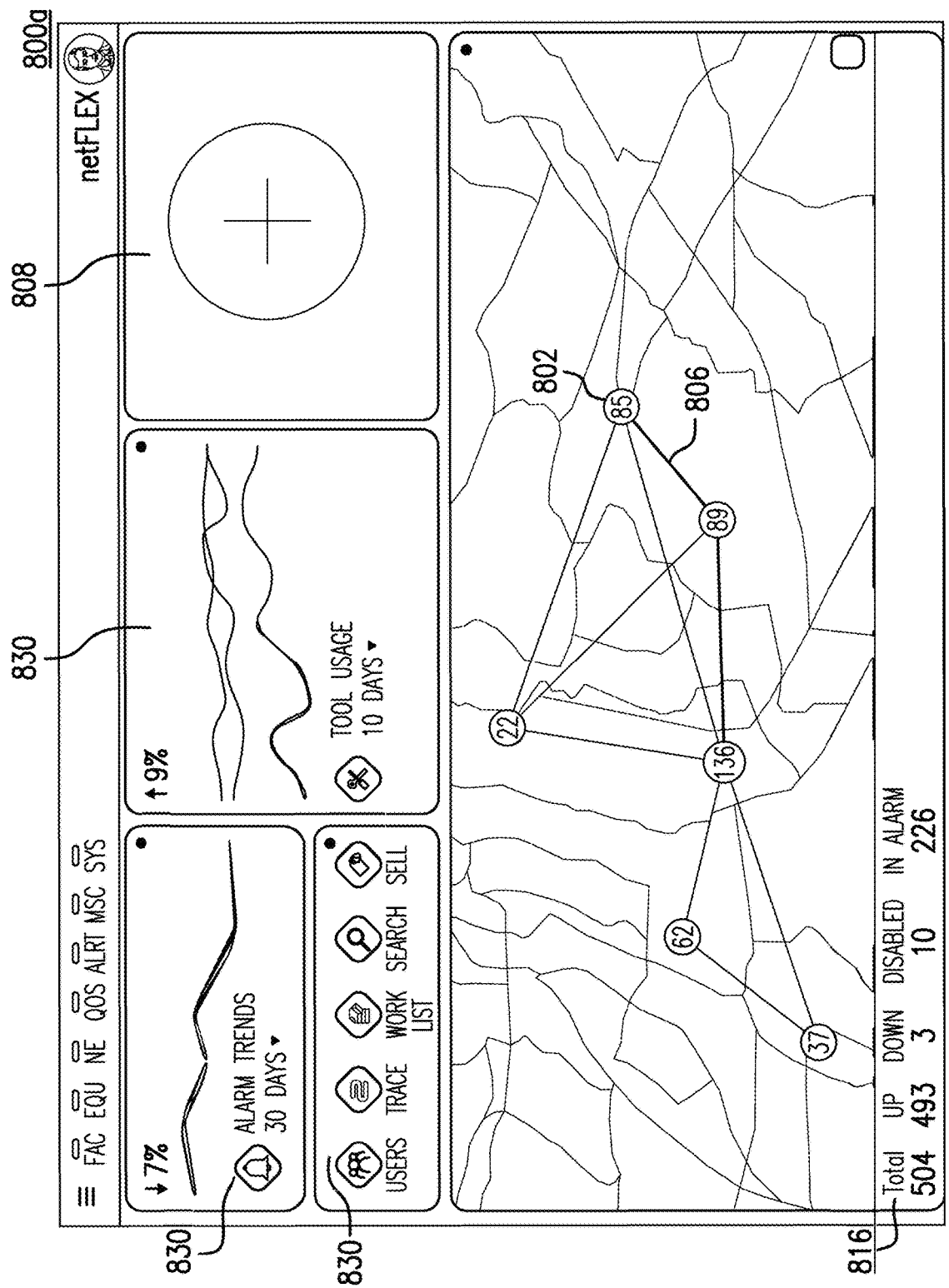
FIGS. 8A-G illustrate exemplary methods for adding a new application to a user device interface.

In FIG. 8A, interface 800a illustrates an exemplary embodiment for displaying network data. In one window, interface 800a depicts a geographic map having points 802 connected by links 806. In additional windows applications 830 and a network elements summary 816, each displaying current network performance data such as alarm trends, tool usage, etc. Interface 800a also comprises customizing window 808. When a user selects window 808, the system responds by displaying interface 800b depicted in FIG. 8B. In an additional embodiment a user can add or remove apps without selecting 808. Furthermore, while FIG. 8A depicts windows, the system may also display applications 830 in an overlay fashion.

Figure 8B:
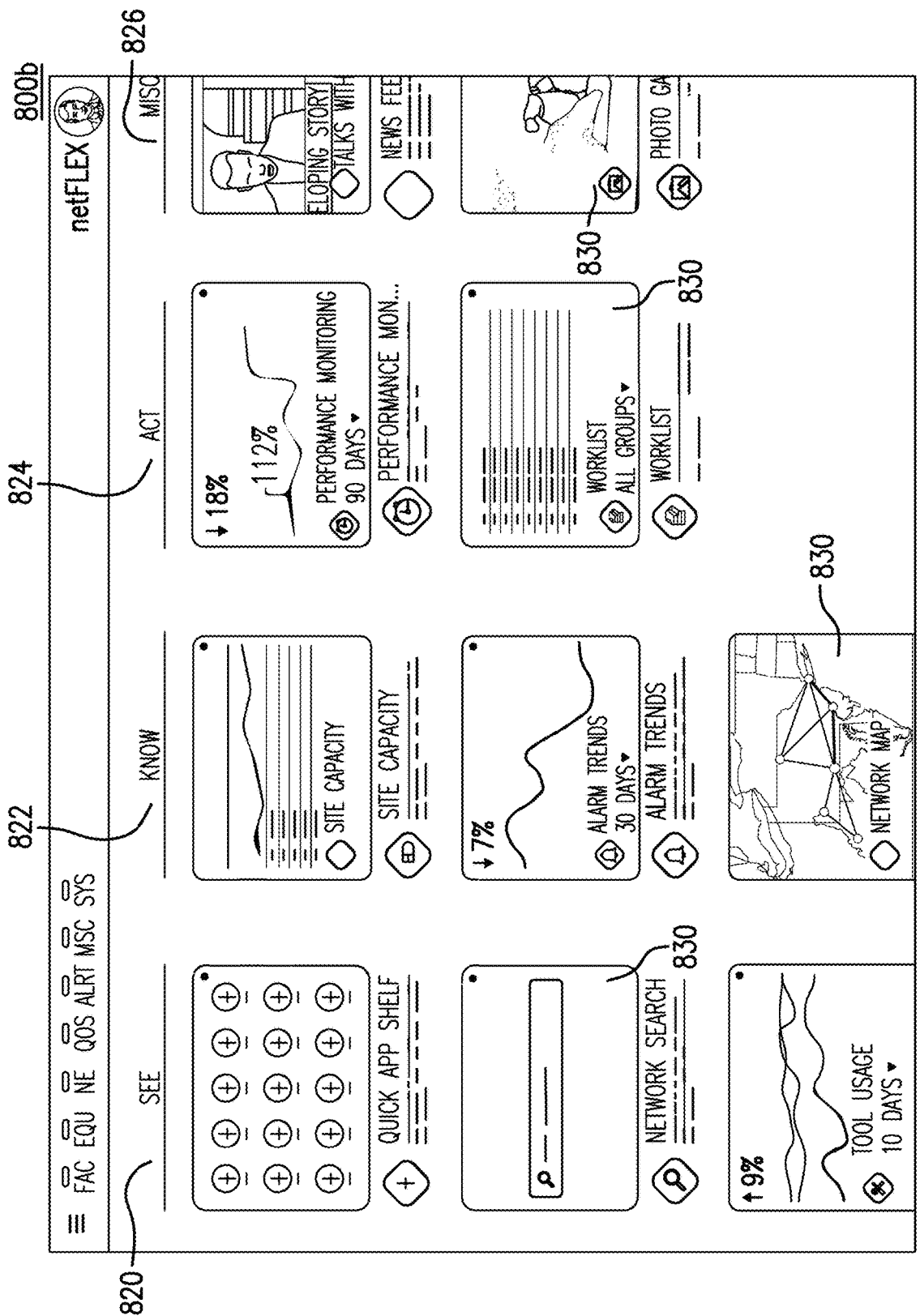

In FIG. 8B, interface 800b displays a subset of application options (collectively labeled application 830) available for a user to customize the network property data displayed on a user device associated with the user. As shown, the applications may be arranged by category. For example, the applications may be arranged under "See" category 820 which includes applications that allow a user to see the network, including, for example, network inventory, maps, trace, and capacity information; "Know" category 822 which includes applications that allow users to view alarms, performance, or other metrics that indicate the network's performance; "Act" category 824 which includes applications that allow users to view notifications, worklists, and other actions performed to ensure network reliability and troubleshooting measure being taken, the "act" category also includes applications that allow a user to customize the programmability and actionability, including setting thresholds, notifications, automated remediation actions, and other action triggering events; and "Misc" Category 826 which includes applications that allow users to view information such as news or sports content, stock market data, photos, email, etc. In an embodiment, the described "Misc" content may be obtained from various network and/or non-network sources and inserted, overlayed, etc. using an API.

In embodiments, every user will have access to the same set of applications and capabilities. In an embodiment, a user only has access to applications and capabilities related to his or her access level, permissions level, or job function. For example, a network manager may have permission to view data describing an entire network, whereas an employee responsible for a subset of the network functionalities only has access to a subset of applications and/or a subset of the network data. In embodiments, an overall administrator determines the level of permissions granted to a user.

In embodiments, a super-user may have access to applications that allow the user to interact with the network. In an embodiment, a reports-only user has permission to view data describing the entire network, but does not have the permission or capability to interact with the network. In another embodiment, a provisional user has access to a subset of the applications and is permitted to interact with a subset of the network.

In embodiments, a user has one interface, such as interface 800a or 800c associated with his or her account. In an embodiment, a user has multiple interfaces associated with his or her account and the user can navigate between the interfaces by moving, swiping, scrolling, etc., from one view to another. For example, a user can configure a first view or interface to show, for example, only monitoring-type applications and that user can configure a second view or interface to show, for example, only alarm-type applications.

Figure 8C:
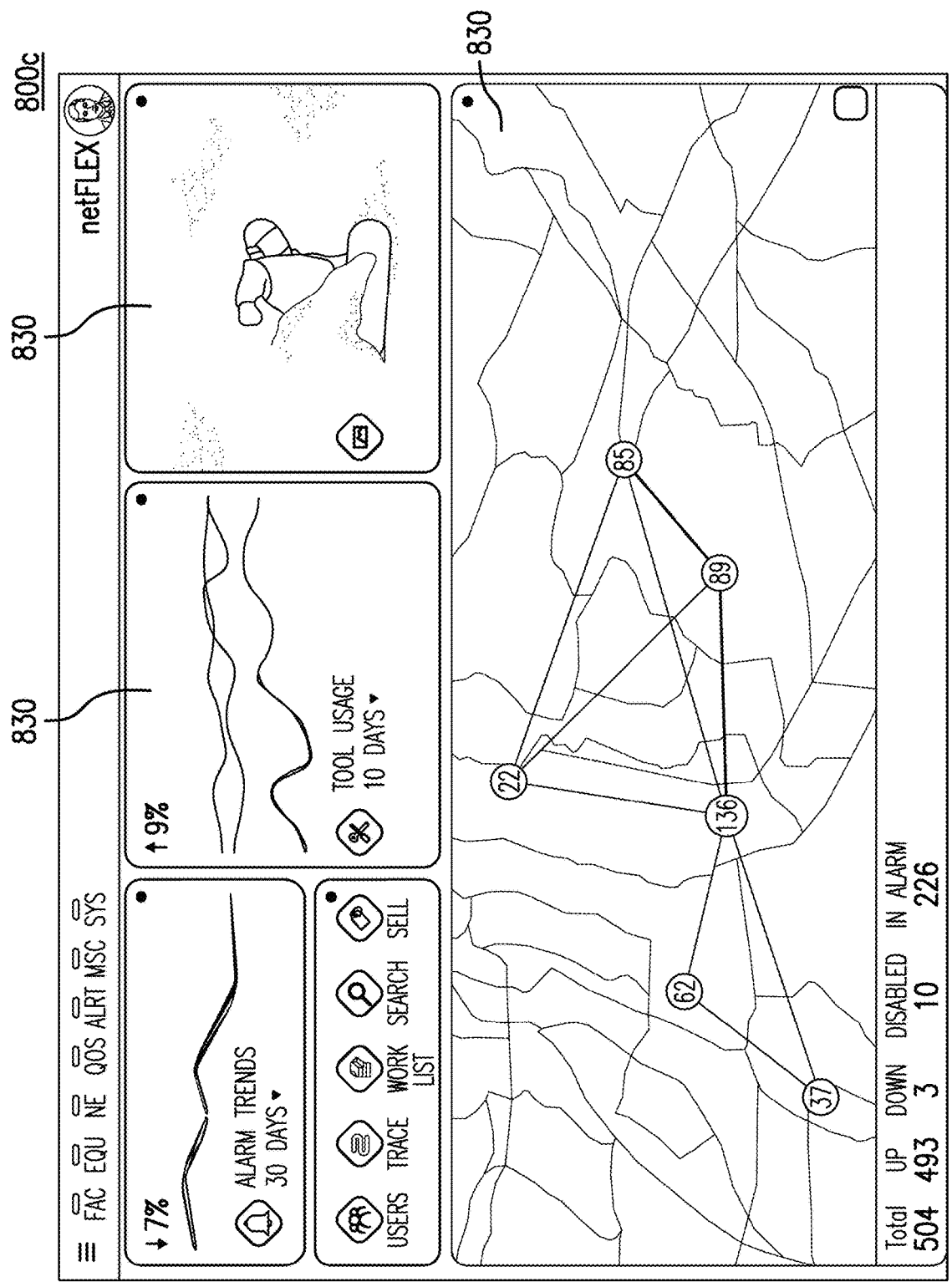

When an application is selected based on the foregoing features, the application appears on the user's display, as shown in FIG. 8C.

Figure 8D:
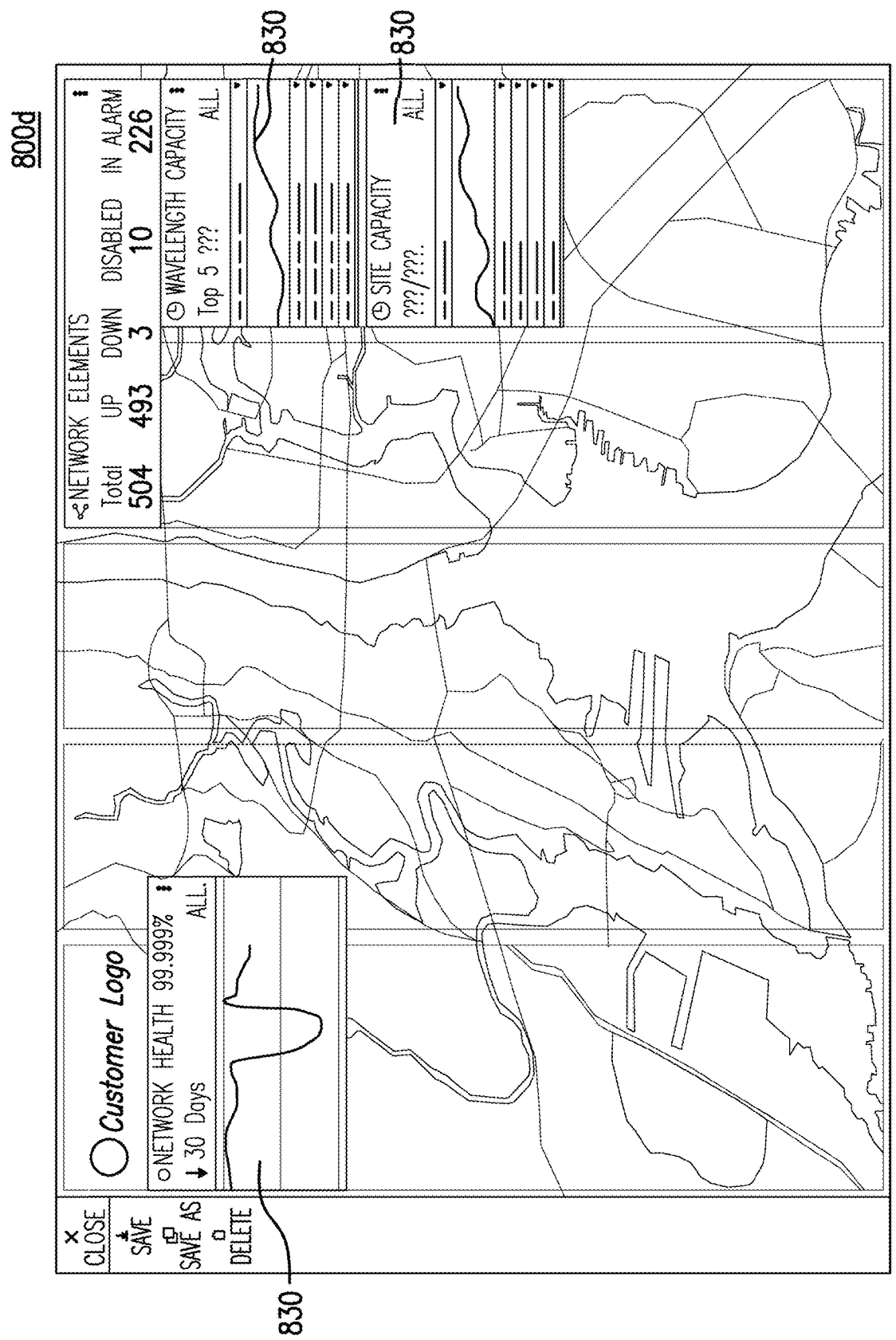

FIGS. 8D-G depict an embodiment for customizing a user's dashboard or view. In FIG. 8D, a user enters an edit mode by selecting an appropriate portion of the screen.

Figure 8E:
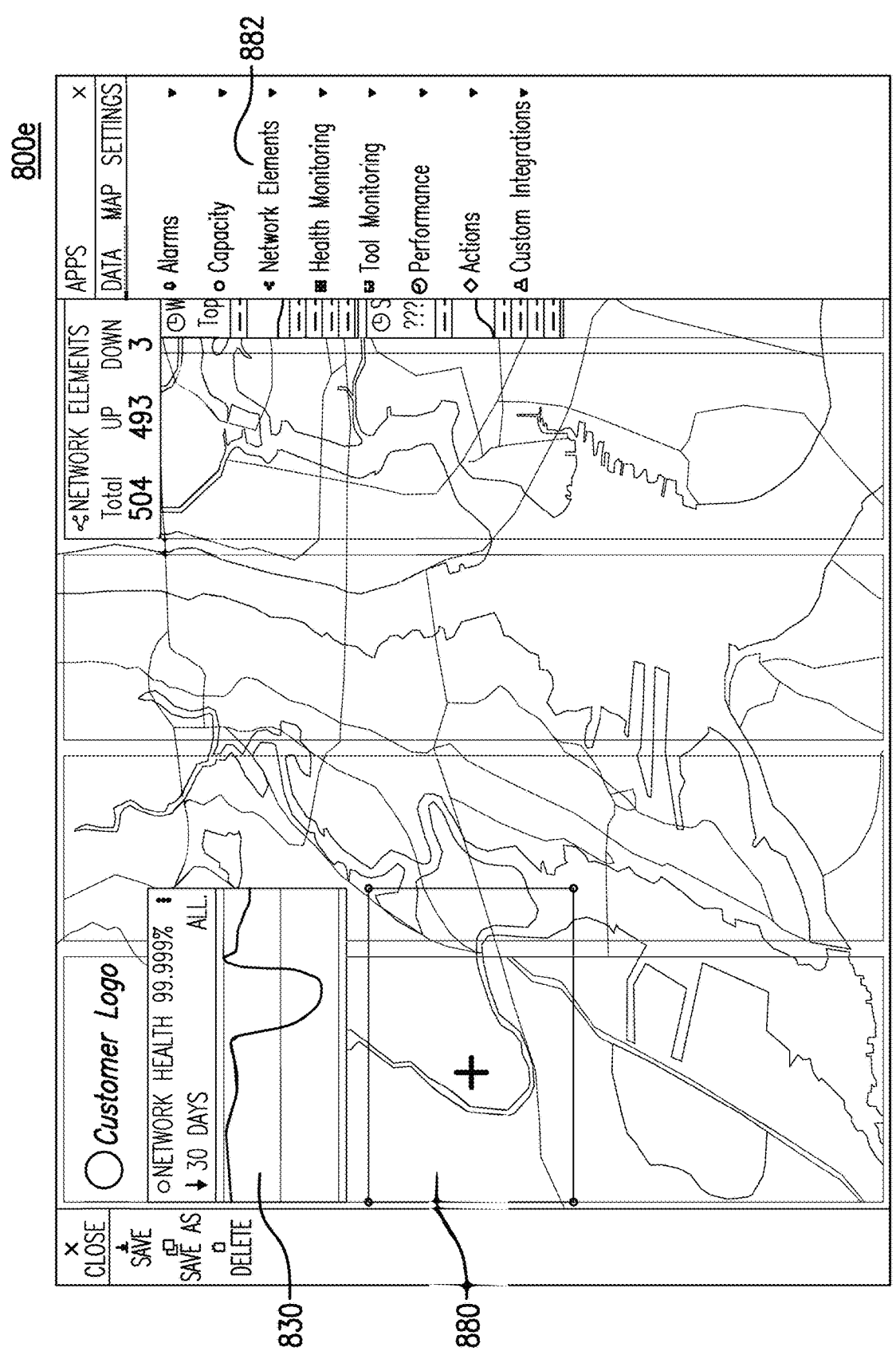

In FIG. 8E, the user selects the placement of an application by moving around box 880.

Figure 8F:
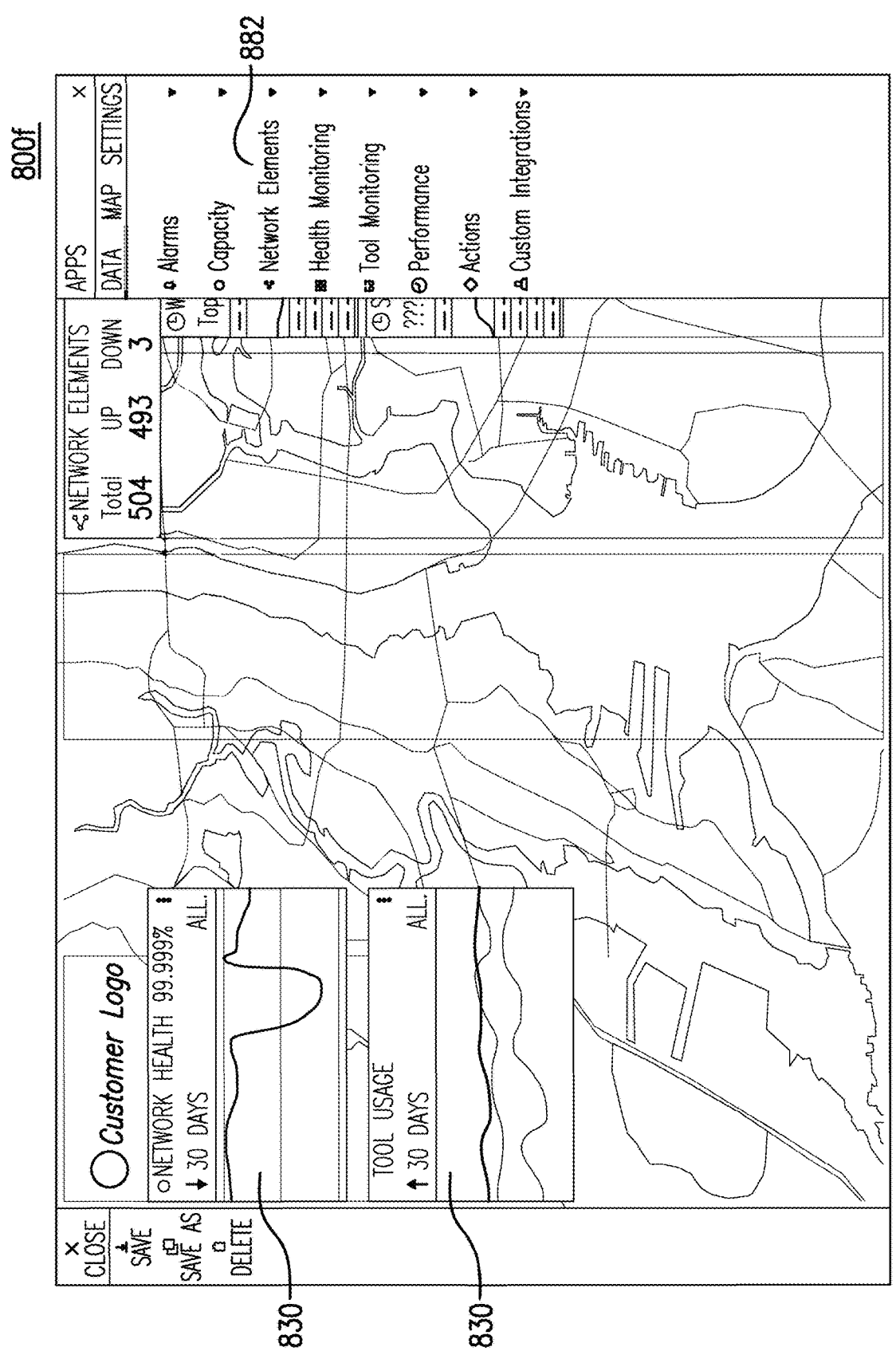

In FIG. 8F, the user is presented with menu 882, the user is provided with application options based on, for example, categories including: alarms, capacity, network elements, health monitoring, tool monitoring, performance, automatic remedial actions, user-defined actions, custom integrations, etc.

Figure 8G:
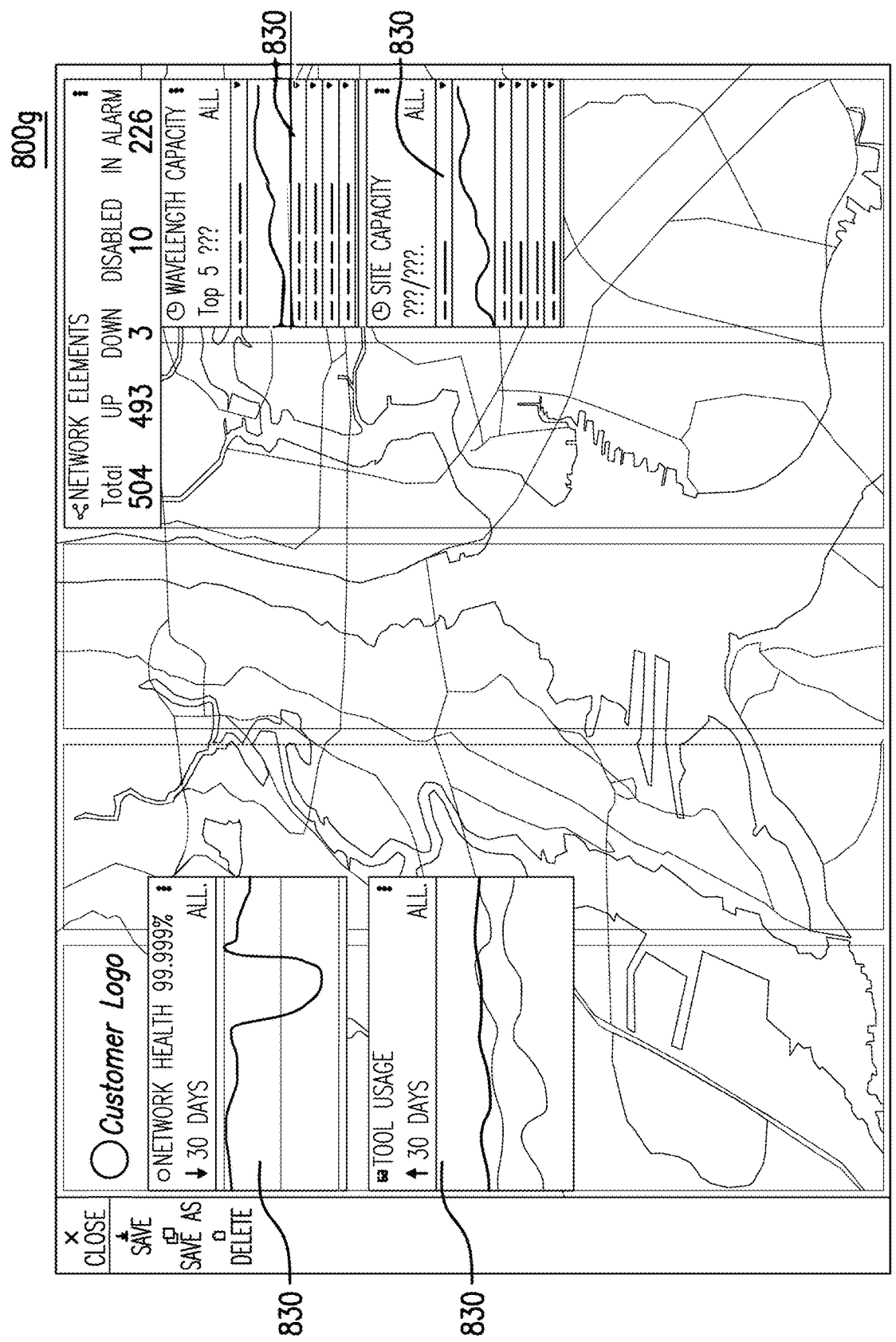

FIG. 8G depicts the placement and screen size of a new application, tool usage. However, any other application available to the user, based on the above criteria, may be selected for that position or any other position on the user's display or interface.

Figure 9:
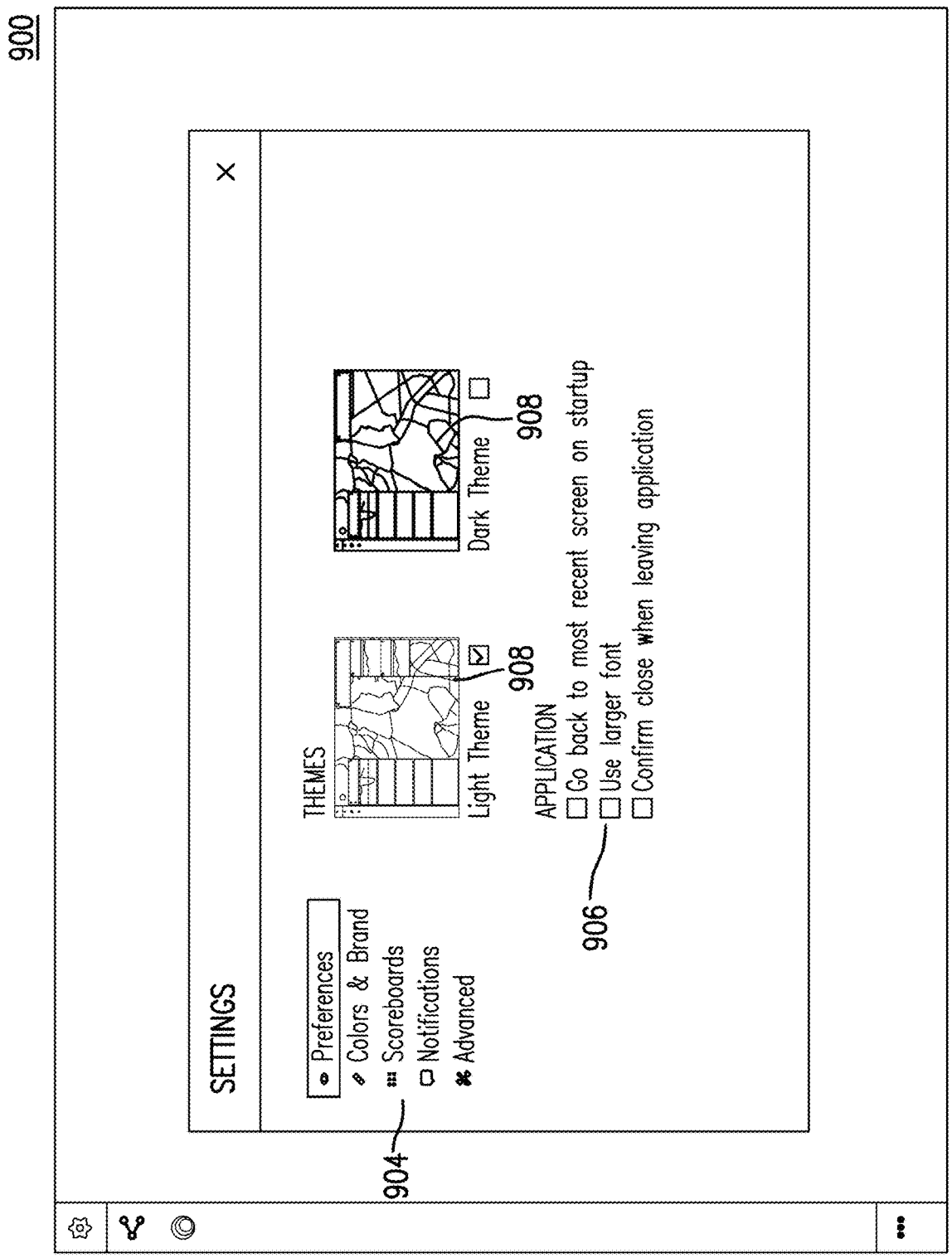
FIG. 9 shows an interface for customizing a user-device display and interface.

FIG. 9 depicts additional preferences 906 and 908 for customizing a user's network property display. For example, a user may select a light or a dark theme, font size and colors, custom logos to add from external sources, go back to the last screen on startup, etc. Task bar 904 also depicts additional pages of settings that are available for some users.

In embodiments, applications 630 (illustrated in FIGS. 6B-C), 830 (illustrated in FIGS. 8A-G) and 1830 (illustrated in FIGS. 18A-C) comprise the following applications:

Each of the described applications may operate and may be presented to a user (i.e., customer, operator, technician, etc.) as a stand-alone application to monitor and/or control network elements. Each of the applications may be added or removed through a user interface based on a user's or administrator's preferences according to the user's permissions/authorizations. Additionally, the applications may be presented as part of a predetermined configuration that is personalized for the particular user based on the user's job function, permissions, authorizations, employer, etc. Furthermore, the functionality of one application may be combined, or implemented, either wholly or partially within one or more of the other applications.

While in an embodiment some users may have access to each of the applications and functionalities described below, in other embodiments, some users (i.e., customers, operators, technicians, etc.) may have access to a subset of the applications and functionalities based on their respective services, authorizations, permissions, etc. Similarly, while in an embodiment some users may have access to all network data, in other embodiments, some users (i.e., customers, operators, technicians, etc.) may only have access to a subset of the network data based on their respective services, authorizations, permissions, etc.

In embodiments the network data and applications that are available to the respective users may be presented or displayed directly to a user device or via one or more APIs.

As described above, in embodiments, misc. content (i.e. news or sports content, stock market data, photos, email, etc.) may also be obtained from various network and/or non-network sources and inserted, overlayed, etc. via one or more APIs.

Login/Authenticate Application:

The login/authentication application allows a user to log into the network management system using credentials such as a PIN number, a security token, a code word, or any other typical methods for identifying a particular user, in accordance with methods 200 and 300.

In embodiments, the application may further require a specific physical object such as a smart phone, smart card, USB drive, RFID chip, keys, or token devices. In embodiments, the login/authenticate application may be used within one or more of the following applications.

In an embodiment, no other applications are accessible until after a user, customer, operator, technician, etc., has been authenticated using the login/authentication application.

Rules Engine Application:

The rules engine application allows a user to setup rules-based processes when a specific network condition is detected within a partitioned network or service. For example, a user may specify what action should occur when the condition is satisfied. As described above, for example, a specific condition may trigger a remedial action, including sending a notification, updating a worklist, performing a network-automation-control action, alerting a ticketing system, updating a workflow or dispatch system, and others.

Map View Application:

The map view application provides a map view of the network nodes. An embodiment of the map view application is illustrated, for example, in FIGS. 5 and 6A-C. In map view embodiments, the nodes appear on a map based on the node's global position (e.g., GPS data). In embodiments, the map view shows lines drawn between the nodes showing network connections. In embodiments, the map view application includes functionality that allows a user to select or view network element properties of the network nodes.

Alarms List Application:

The alarms list application provides a list of all of the alarms reported within the entire network. In embodiments, every alarm will be visible to a user, whereas in other embodiments only a subset of alarms are visible based on the user's access permissions. For example, a customer of the network can only view the alarms related to services provided for that customer. In an embodiment, the alarms list application may be displayed, for example, using display interface 1000 illustrated in FIG. 10.

Figure 11:
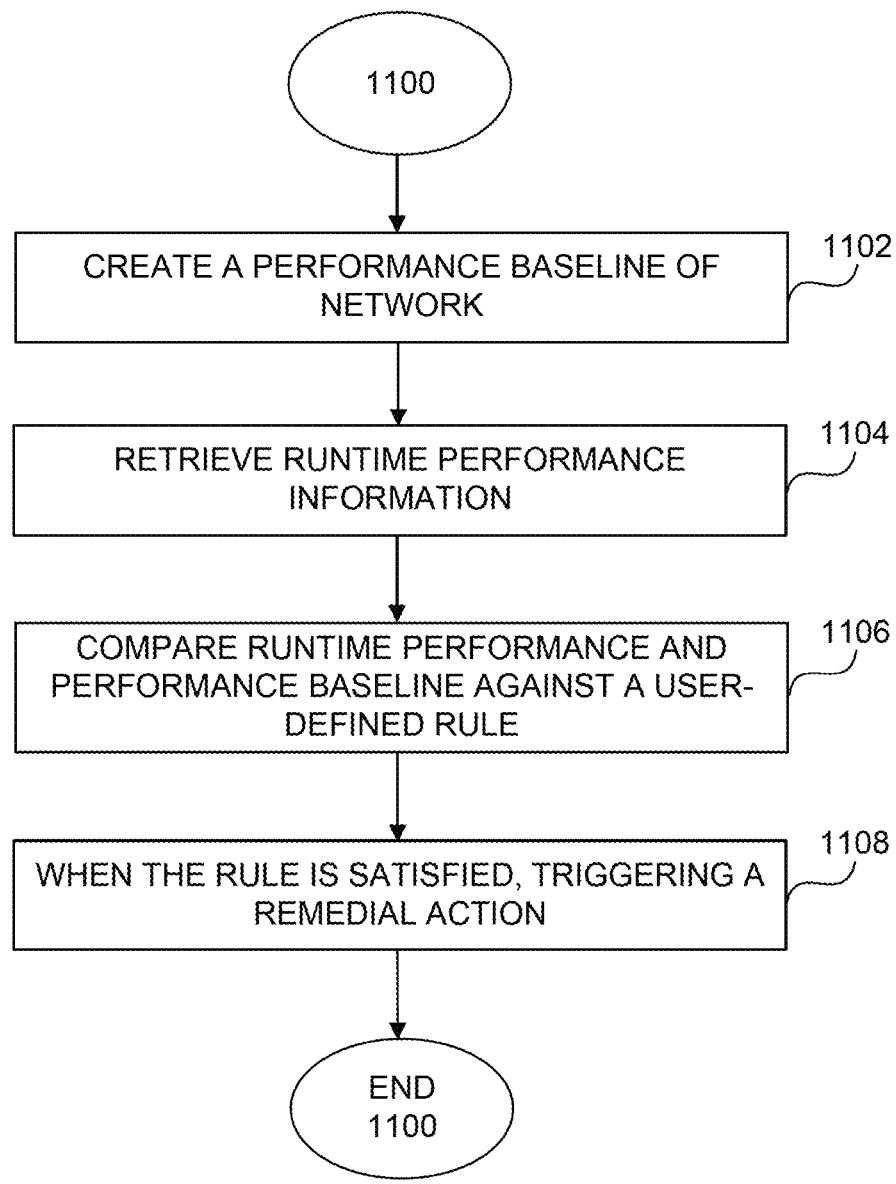
FIG. 11 illustrates a method for proactively or reactively isolating a physical trouble in a network, according to an embodiment.

To determine whether an alarm condition exists, the system and methods (i.e., methods 200 and 300) disclosed herein may further include monitoring network properties to determine whether a threshold, an alarm condition, or any other user-defined rule has been met. FIG. 11 illustrates an exemplary method 1100 for monitoring performance of a network according to an embodiment and when rule is satisfied, triggering a remedial action, such as, for example, sending a notification, updating a worklist, performing a network-automation-control action, alerting a ticketing system, updating a workflow or dispatch system, and others. In an embodiment, the remedial action is configured or specified using the Rules Engine Application described above. While method 1100 of FIG. 11 is primarily directed to an OTN, a person of ordinary skill would understand how to create a performance baseline for other data transport technologies.

Method 1100 begins at step 1102, by creating a performance baseline representing a performance of an optical transport network apparatus. Creating the performance baseline may involve first determining an inventory (e.g., via methods 200 or 300), that is, a complete database of all the circuits, connections, ports, and cards on the optical transport network.

In an embodiment, initially captured performance data may constitute a performance baseline of the optical network, including the wavelength level for one or more optical fibers within the OTN. Additionally or alternatively, the performance baseline of the optical network may be created by calculating the performance baseline based on the length of the patch cords and the locations corresponding to the plurality of optical network elements. From this calculation, a performance baseline may be created without a need to conduct a test.

At step 1104, performance information of the plurality of optical elements is collected during runtime at various time periods. The runtime performance information can include any of the network property data described above for a specific wavelength (or wavelengths), including light levels, bit error rate (BER), throughput, latency, and/or jitter for each port and each connection in the optical transport network. To collect the runtime performance information, the controller may communicate with each of the optical network elements. The controller may communicate with the ONEs using the resource adapters described above. The performance data may be collected intermittently or periodically, such as daily, hourly, weekly, or in real-time. ONEs may provide periodic heartbeats to indicate their availability. They can provide capacity information both physically and on the line or logically within a particular service, such as a particular VLAN, Ethernet circuit, or other service provided to a customer.

At step 1106, the runtime performance information is compared against the performance baseline and against a user-defined rule. The user-defined rule may be a rule specified by the customer indicating an acceptable degree of variation from the performance baseline. For example, a customer may specify that it would accept one standard deviation, given daily variance levels, of a particular performance characteristic from the performance baseline. In another example, the customer may specify the user-defined rule with respect to operating ranges of the ONEs as defined by the equipment manufacturers. For example, a customer may set a rule to trigger an action when the runtime light levels are within 60% of the equipment manufacturers' tolerances for the device or wavelength. For example, a customer may set a rule to trigger an action based on a rate of change in the collected performance information.

In this way, by capturing a physical-layer performance baseline at step 402, a controller has captured characteristics of a known good state for the OTN. It means that the controller at step 1104 can diagnose conditions and track changes before an issue gets outside of tolerances allowed for devices. And when the network data properties are outside a threshold, the system is configured to alert or notify a user that an alarm condition exists. As explained above, when conditions are outside of predefined and/or user-specified threshold, the system may also perform a remedial action, such as, for example, sending a notification, updating a worklist, performing a network-automation-control action, alerting a ticketing system, updating a workflow or dispatch system, and/or other remedial tasks. In an embodiment, the remedial action is configured or specified using the Rules Engine Application described above.

Circuit and Capacity Reporting Application:

The circuit and capacity reporting application provides a list of all of the circuits within the entire network, the capacity of the circuits (e.g., 1G 10G, 100G, etc.), and/or the status of the network, including whether the circuits are in use, reserved, or available. In embodiments, data describing every circuit will be visible to a user, whereas in other embodiments only data describing a subset of circuits are visible to a user—based on the user's access permissions. For example, a customer of the network may only have permissions to view the circuits, capacity, and/or use of the circuits that are related to services provided to that customer. In an embodiment, the circuit and capacity reporting application may further trigger automatic and/or user-defined remedial action(s). In an embodiment, the remedial action is configured or specified using the Rules Engine Application described above.

Figure 14A:
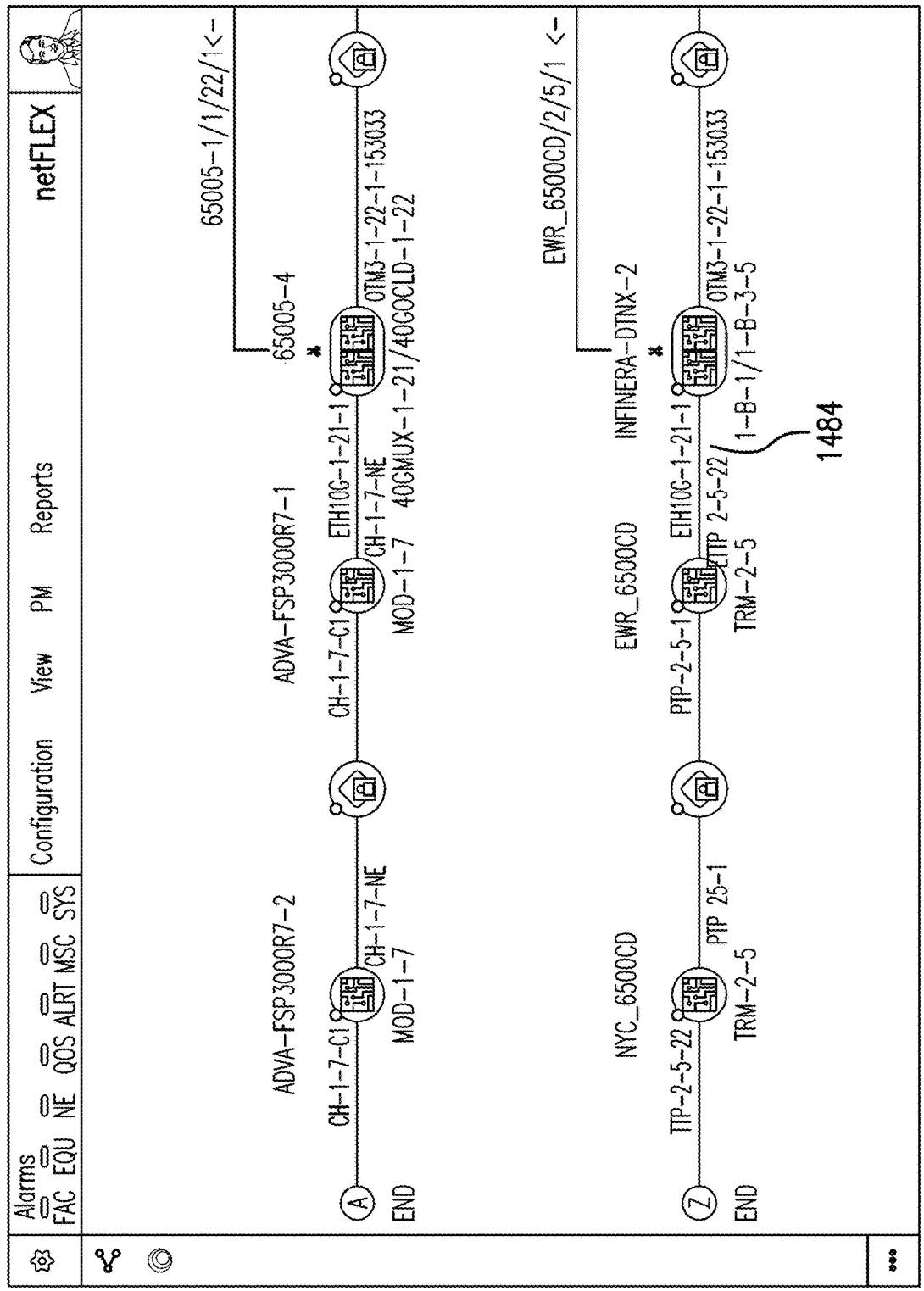
FIGS. 14A-B show exemplary circuit analysis tool application and trace application displays and interfaces.
Figure 14B:
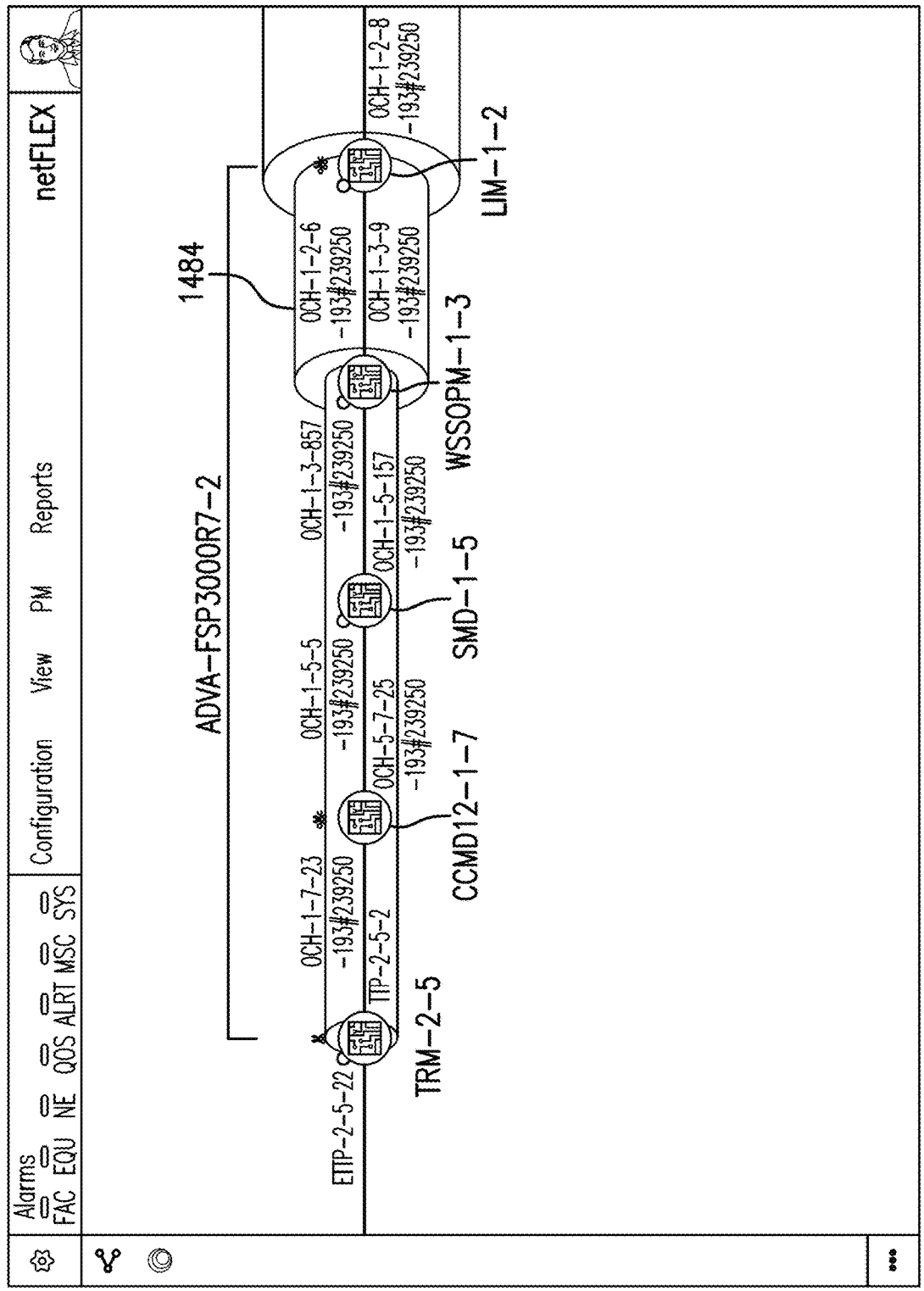

Trace Application:

The trace application is an automated tool that displays, or causes a user device to display, an end-to-end circuit within the network. In embodiments, the trace application uses data retrieved by the controller 430 and the inventory database 436. The data obtained by the trace application may be displayed, for example, using display interface 1400*a* illustrated in FIG. 14A and/or interface 1400*b* illustrated in FIG. 14B. Each direction of the circuit signal flow is displayed in a separate path, site A towards site Z in one direction and site Z towards site A in the opposite direction.

Circuit Analysis Tool (CAT) Application:

The CAT application is an automated tool for troubleshooting a circuit from end to end and obtaining data related to the circuit. In one embodiment, the performance information may be displayed to the user as illustrated in an interface 1200 in FIG. 12. FIG. 12 shows interface 1200 of a circuit analysis tool that reports to the user the optical network elements provided for a particular network service and the performance information retrieved for the optical network elements. As shown in interface 1200, the circuit has an A-end 1202 and a Z-end 1214. Between A-end 1202 and a Z-end 1214, are optical network elements 1204, 1206, 1208, 1210, 1212, in that order. For each of optical network elements 1204, 1206, 1208, 1210, 1212, interface 1200 shows a respective panel 1220, 1222, 1224, 1226, and 1228. Each of the respective panels 1220, 1222, 1224, 1226, and 1228 display collected performance information relating to the relevant port used by the optical network element to provide the requested network service. As shown at, for example, 1214, interface 1200 may indicate with a special color other indication when a signal failure or error exists (e.g., light levels are below thresholds defined by user-defined rules). This is reflected in step 2006 in FIG. 20, described below. A circuit analysis tool may also provide reports to the user, for a particular network service and the network element properties, including performance information, retrieved for the optical network elements, using one or more of the configurations illustrated in FIGS. 5, 6A-C, 8A-G, 10, and 13-19A-C.

Figure 13:
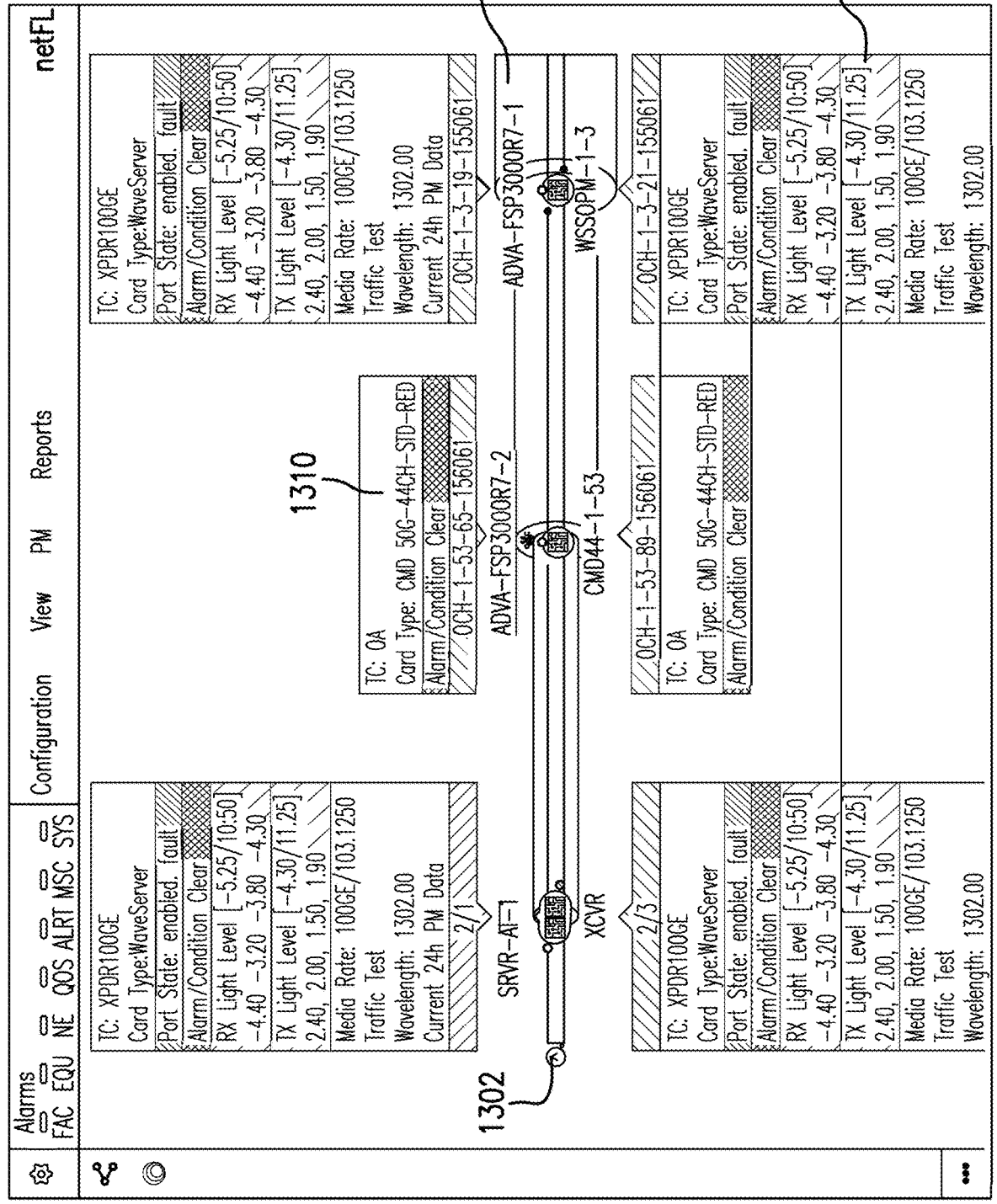
FIG. 13 shows an exemplary circuit analysis tool application display.

In an embodiment, the data obtained by CAT is displayed, for example, in FIG. 13. FIG. 13 illustrates an embodiment for displaying obtained network data, for example, using data obtained by the CAT and/or the Trace applications described above. As shown, each layer of the network is parsed and displayed using a different pipe-like or cable-like diameter. The pop-out boxes that appear above and below display, or cause the user device to display, the retrieved data describing the network properties. In embodiments, as illustrated in 14B, the pipe-like or cable-like display further includes alarm notification feature 1484 by displaying a layer using a different color (e.g., yellow, orange, or red). Each direction of the circuit signal flow is displayed in a separate path, for example site A towards site Z in one direction and site Z towards site A in the opposite direction.

Network Element Summary Application:

The network element summary application provides a list and summary of all of the network nodes and/or network sites. In embodiments, every node or site will be visible to a user, whereas in other embodiments only a subset of nodes or sites are visible based on the user's access permissions. For example, a customer of the network can only view the nodes or sites related to services provided for that customer.

Performance Monitoring Application:

The performance monitoring application provides a report or display that shows historical and real-time data of specific circuits, including one or more network element properties that have been retrieved over a specified period of time. The performance monitoring application may incorporate data collected for any of the other applications described herein, for example, the performance monitoring application may provide historical data captured using the alarms list application, the CAT application, the trace application, and more.

Notifications Application:

The notifications application provides an ability to setup notifications based on a predetermined rule or rules. As explained above, notifications may include email, text, automated voice message, visual alarm, audible alarm, vibration alarm, smartphone notification, etc. In the notifications app, a user determines the rules that trigger a notification and which notification is used based on that rule being triggered. Alarm events may occur at different times of the day or different days of the week, etc. Accordingly, a user may use the notifications app to set notification rules for different times of the day and/or different days of the week. For example, if an alarm event occurs during business hours, the user may set the notifications app to send an email. Alternatively, if an alarm event occurs outside of business hours, the user may set the notifications app to send a text message to a specified device, phone, or phone number associated with the user.

The notification application functionalities may operate as a stand-alone application or it may operate within one or more other applications described herein, including the alarms list application.

In an embodiment, the notification application may further trigger a remedial action based on an occurrence of a predefined or user-specified condition. In an embodiment, the remedial action may be configured or specified using the Rules Engine Application described above.

Figure 15:
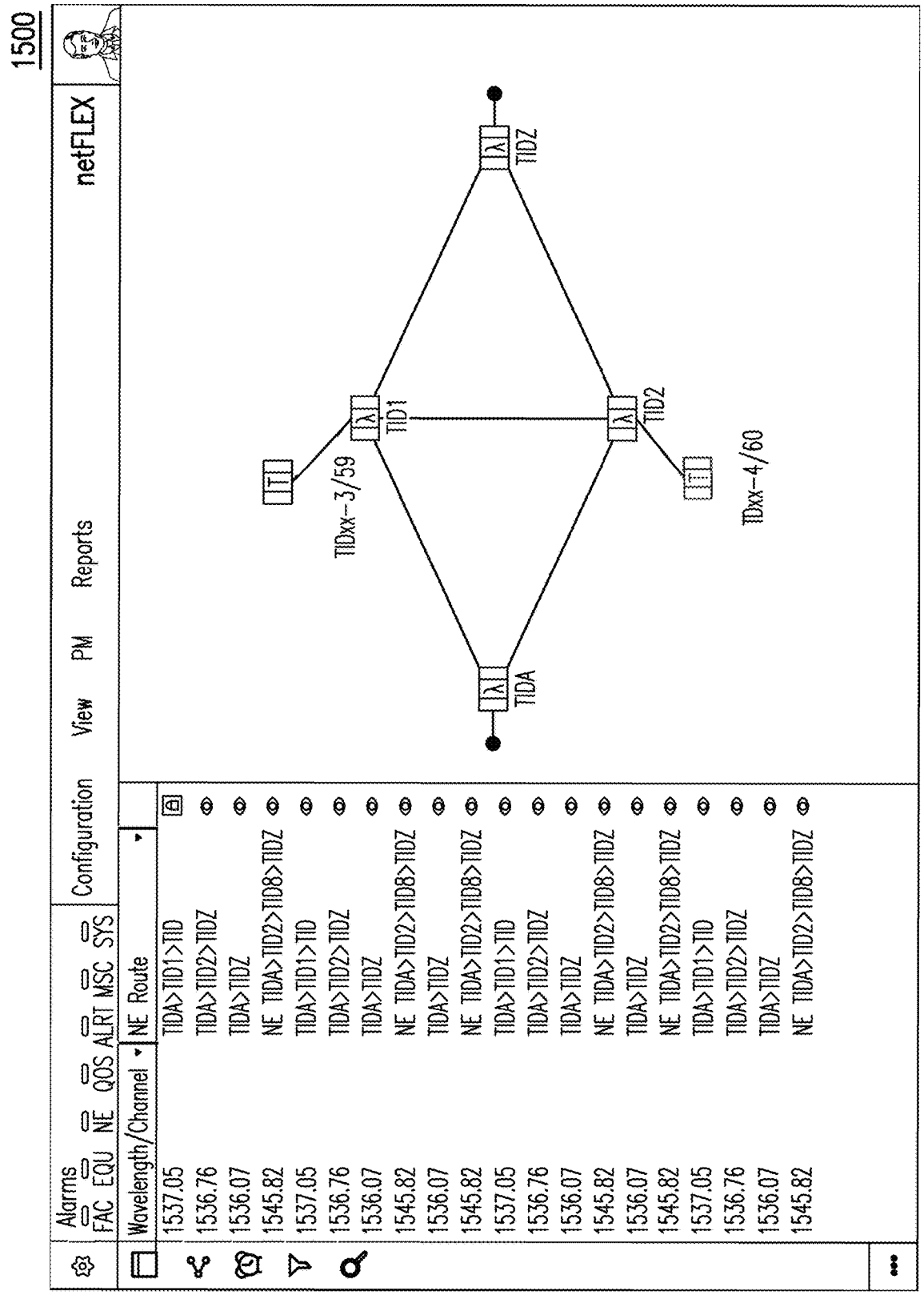
FIG. 15 shows an exemplary network layout application display and interface.

Network Layout Application:

The network layout application provides network layout view of at least one specific network. In an embodiment, the network layout further includes a list of the circuits that are in that network. In another embodiment, the network layout includes a method for calling information from another application, such as the CAT or trace applications and displaying that information within the network layout application. In an embodiment, the network layout application may be displayed, for example, using interface 1500 as illustrated in FIG. 15.

Worklist Application:

The worklist application provides a customized list (i.e., a watch list) that includes circuits that have been selected by a user or automatically selected by the system as a circuit that warrants particular attention. The circuits may be added to the worklist application based on past network performance, expected future network performance, or any other reason that a user may wish to add the circuit. In embodiments, additional rules may be ascribed for monitoring the circuits on the worklist.

Worklist for Capacity Planning Application:

The worklist for capacity planning application provides a customized list or report that provides capacity data for selected circuits. In an embodiment, the worklist for capacity planning further includes notifications and alarms that are triggered when a selected network reaches a predetermined capacity threshold. The worklist for capacity planning application may be particularly useful in areas where network services are rapidly expanding. By monitoring selected circuits, a provider may be able to add additional capacity to a circuit before the circuit reaches full capacity.

Figures 1, 16:
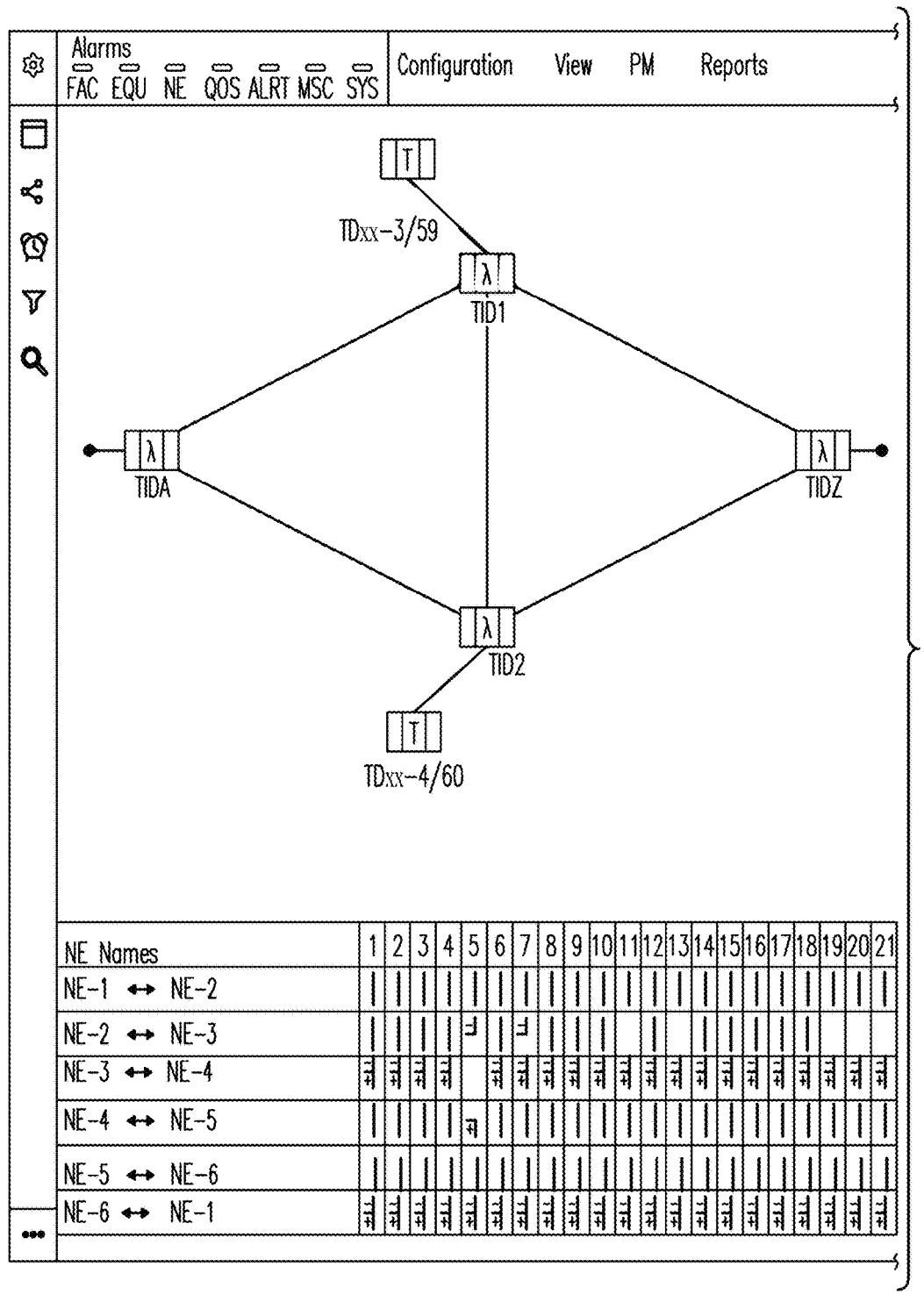
Figures 2, 16:
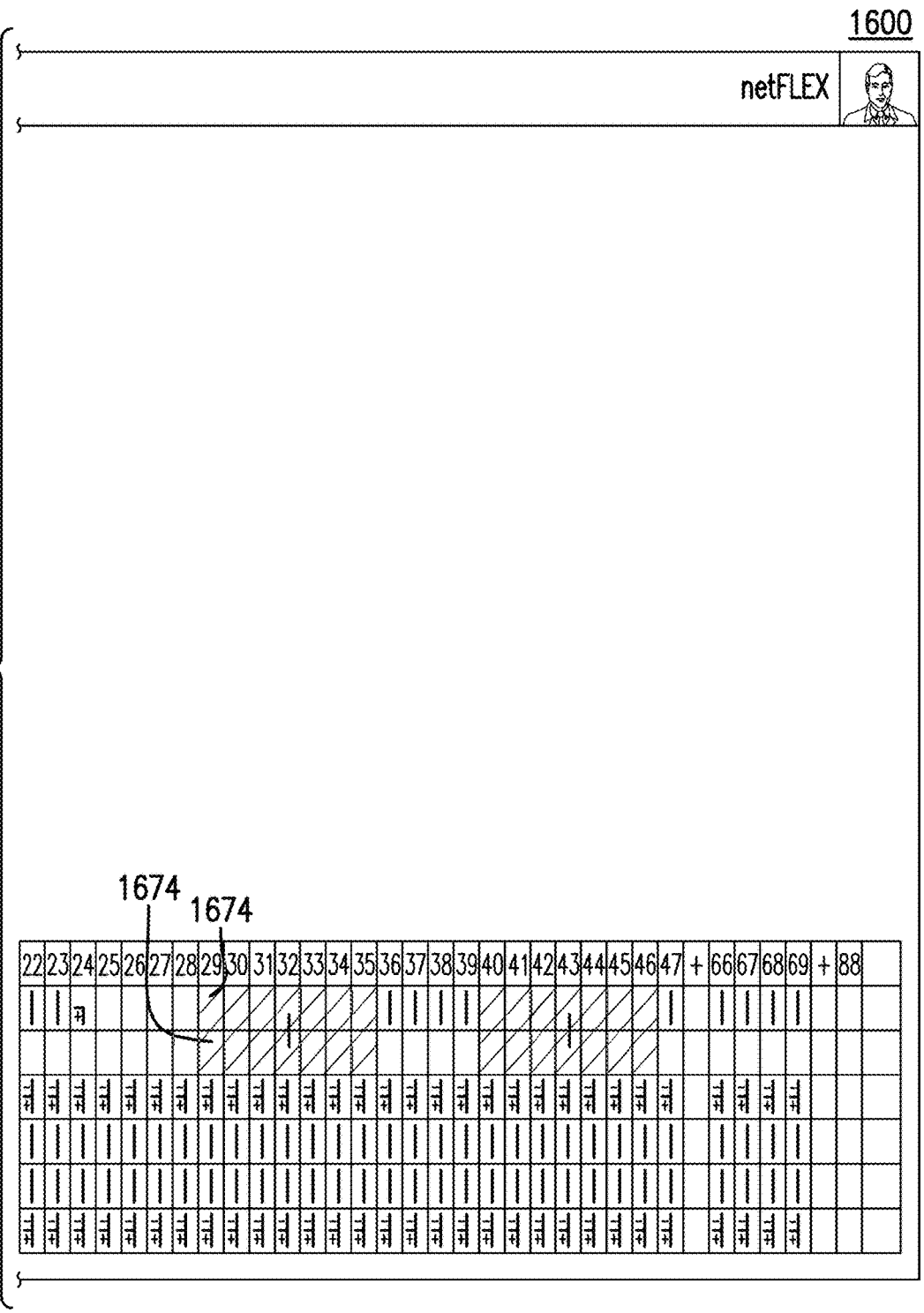

Capacity Reservation Application:

The capacity reservation application allows a user to define or find a data path through a network and reserves the selected path including circuits, ports, capacity, wavelengths, etc. In an embodiment, a user may be network provider's sales representative that is preparing a business proposal for a potential customer. In such an embodiment, the sales representative reserves the proposed services for a period of time. In this manner, networks are preplanned, pre-saved, pre-assigned within the network. The capacity reservations application is displayed, for example, using display interface 1600 illustrated in FIGS. 16-1 and 16-2. In FIGS. 16-1 and 16-2, boxes 1674 indicate available circuits. Accordingly, a user could reserve boxes 1674 for future use within the capacity reservation application. The capacity reservation application is particularly useful when negotiating a network service with a potential customer. By reserving an agreed upon circuit, port, capacity, wavelength, etc. from end to end, the provider and potential customer alike can be assured that the network service will still be available at a future date. Furthermore, the capacity reservation application saves the provider several hours or even days when deploying the circuit by eliminating the laborious manual process of finding available network connections.

Find Capacity Application:

The find capacity application is an automated tool for finding a path through a network from a first location to a second location based on a specific data capacity. For example, in an embodiment, a user can enter a location such as New York City as a first location and location such as Dallas as a second location. The user then selects a desired bandwidth or capacity for the future circuit. Upon receiving this data, the find capacity application determines a path from New York City to Dallas using the obtained available capacity of network nodes between the two locations. Conventionally, this laborious manual process may take a user (or users) several hours or even days to find a network path having a desired bandwidth or capacity. In an embodiment, the find capacity application is coupled with the capacity reservation application so a user may find capacity and reserve it in an efficient and user-friendly way.

Sales Insight Application:

The sales insight application provides a report or table indicating the capacity of specific network nodes, predictive calculations of how fast the wavelengths or circuits are being sold, amount of lead time required to begin a new service, and other capacity calculations describing the network, capacity, shelf, cards, etc. The sales insight application is displayed, for example, using display interface 1700a as illustrated in FIG. 17. In embodiments, as illustrated in FIG. 17, the sales insight data may include: owner 1752, data speed 1750, port location 1756, status 1758, port identification 1760, and alarm status 1762.

Infinite Network Operations Center (NOC) Application:

The Infinite NOC application provides real-time functionality that allows a user to view, troubleshoot, and fix (or cause to be fixed) a network, circuit, card, port, etc., from a remote location. In embodiments, the NOC application could also use augmented reality, virtual reality, and/or mobile video conferencing technologies within the application. The Infinite NOC application may operate as a stand-alone application or it may operate within one or more of the other applications described herein to enhance the user-interface, user experience, or application functionality.

Figure 18A:
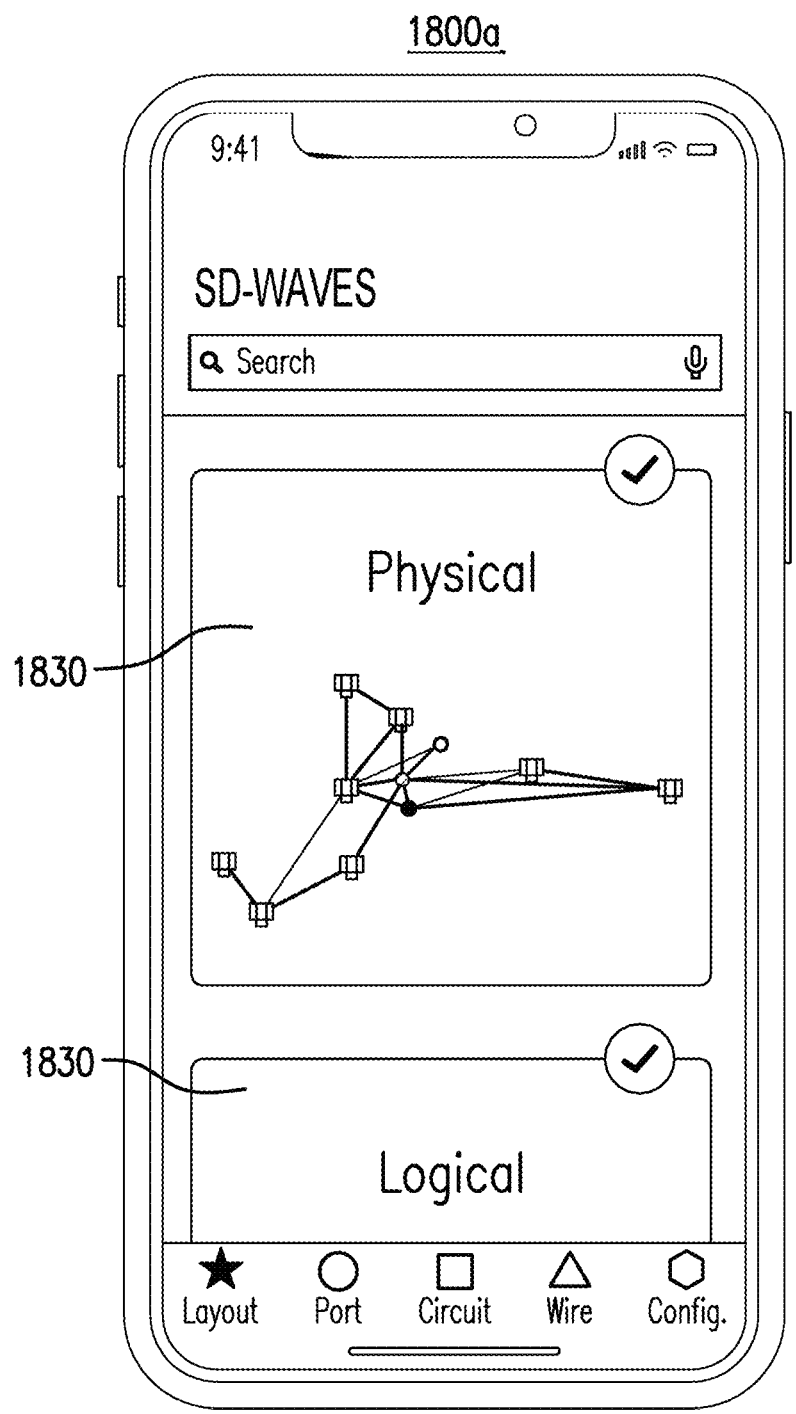
FIGS. 18A-C show exemplary network application displays and interfaces.
Figure 18B:
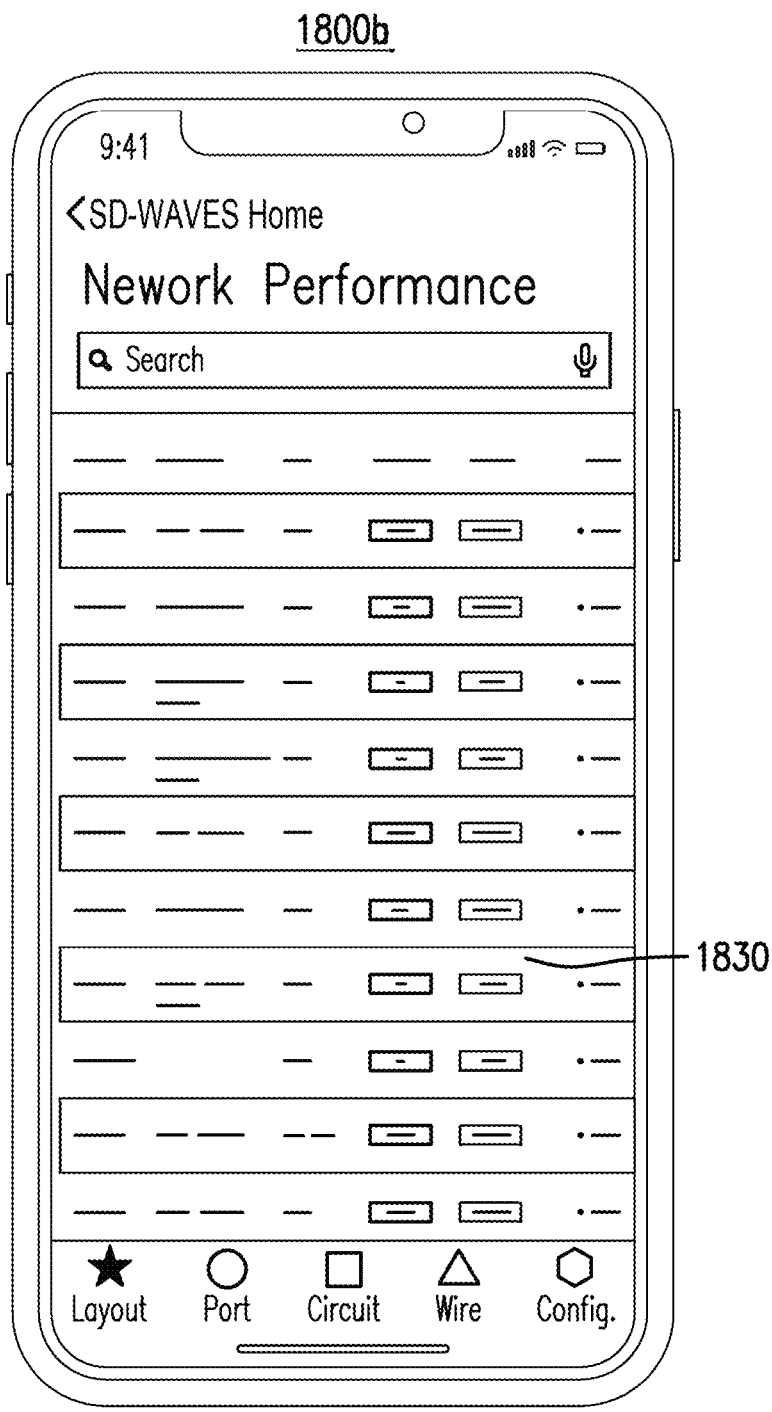
Figure 18C:
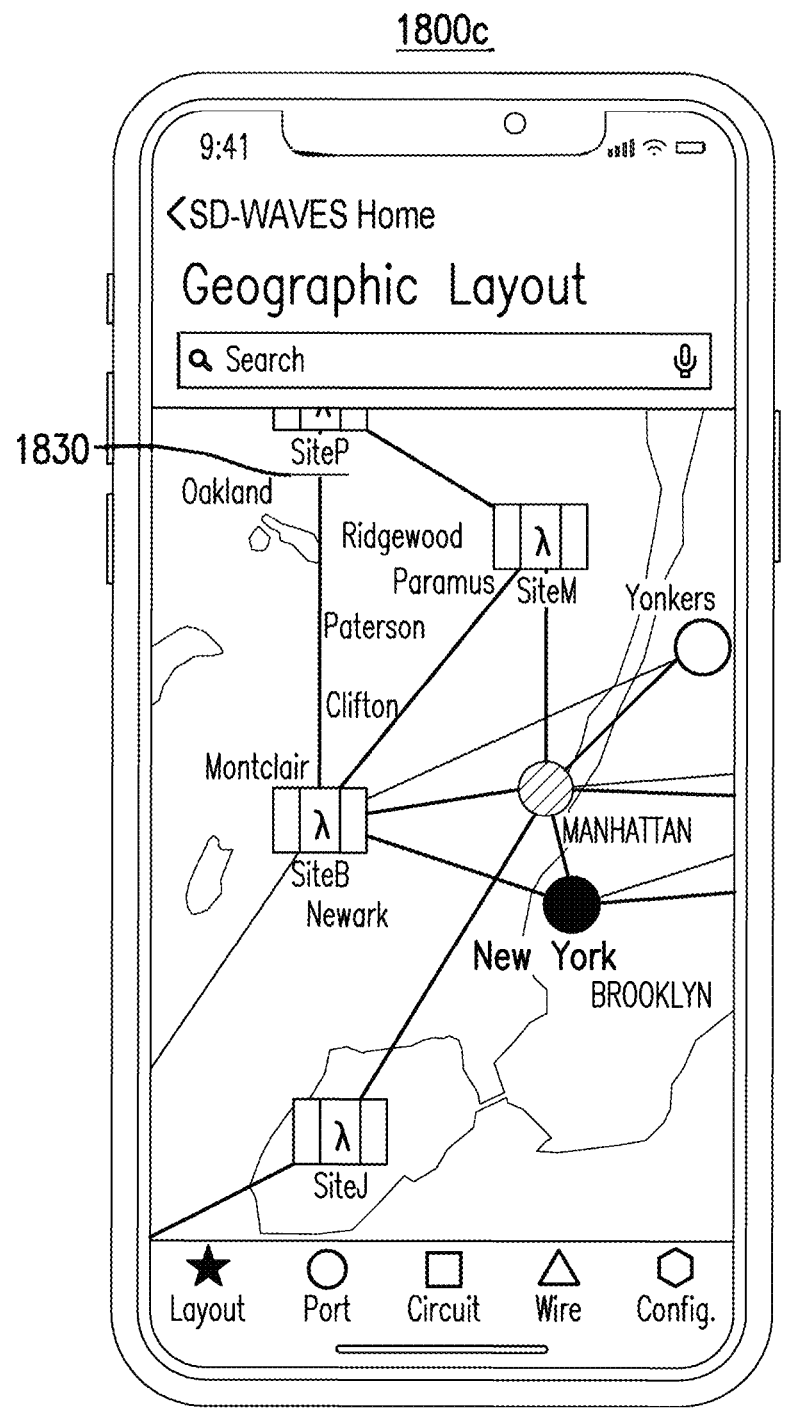

Intelligent Network Monitoring Application:

The network monitoring application retrieves multiple applications and consolidates the applications 1830 into a display or view, based on a network monitoring application associated with the user. The network monitoring application view is displayed, for example, in FIGS. 18A-C. While FIGS. 18A-C depict using a smartphone as a user device, the applications described herein are not confined to a specific user device. Rather, the applications described herein may be implemented using a computer, a tablet, a smartphone, a gaming system, a smart watch, a television, an augmented reality device, a virtual reality device, or any other device capable of displaying the information described herein.

SD-WAVES External Customer Access Application—Network Visibility and Control:

SD-WAVES network visibility and control application provides network access and visibility to an external customer of the network provider. For example, the external customer may access and view a complete group of connected network elements specifically installed for that specific customer. In an embodiment, the access provided does not contain any other external customer circuits or equipment.

In an embodiment, this SD-WAVES network visibility and control application allows the external customer to view network inventory and data as described in one or more of the applications described herein, including the alarms list, trace, and CAT applications.

In an embodiment, the external customer will only be authorized to view specific network elements describing the customer's specific services. specific network elements and only those network elements. In such embodiments, all other network elements residing on that controller 430 and inventory database 436 are blocked from that external customer's access and/or view.

SD-WAVES External Customer Access Application—Service or Partitioned-Circuit Visibility:

The SD-WAVES service or partitioned-circuit visibility application allows an external customer of the network provider access to view specific circuits assigned to that external customer. These partitioned circuits utilize network elements comprising circuits that belong to one or more other external or internal customers. In an embodiment, the circuits belonging to other customers are blocked from this specific customers view. Components of the network element that contain multiple customer circuits are hidden from the specific customers view. For example, only the network element components (i.e., 402, 404, 406, 408, 410A . . . N as illustrated in FIG. 4) that belong to specific customers (i.e., C1, C2, C3, C4 & N, NE, NW as illustrated in FIG. 4) would be visible to those respective customers through the SD-WAVES service or partitioned-circuit visibility application.

In an embodiment, the external customer will only be authorized to view specific network elements describing the customer's specific services. specific network elements and only those network elements. In such embodiments, all other network elements residing on that controller 430 and inventory database 436 are blocked from that external customer's access and/or view.

SD-WAVES Connect Application:

The SD-Waves connect application provides a report and functionality for adding new circuits and new wavelengths to a network. This provides a user-friendly way to execute a new circuit or service associated with one or both of the SD-WAVES network visibility and control and SD-WAVES service or partitioned-circuit visibility applications. For example, the SD-WAVES connect applications executes a route that was traced, found, and/or reserved any one of the applications described above. In embodiments, the SD-WAVES application is displayed as interface 1900 of FIGS. 19-1 and 19-2. FIGS. 19-1 and 19-2 illustrate a table showing customers 1960, connection speed 1962, port status and ID 1966, alarm state 1968, and cross connect status 1970. FIGS. 19-1 and 19-2 further depict the circuit availability between a first location 1964 and a second location 1972. In the scenario depicted in FIGS. 19-1 and 19-2, there are two circuits available, two circuits pending approval, and six connected circuits. In an embodiment, the SD-WAVES connect application may also, or alternatively, include a map view, similar to the map view application.

Capacity Harvest and Inventory Migration Application:

The capacity harvest and inventory migration application provides a summary of a network, including a circuit services inventory. The capacity harvest application determines what nodes, cards, wavelengths, etc. are located in the selected network. In an embodiment, the capacity harvest application determines what services, capacity, wavelengths, etc. are unused and available. In an exemplary embodiment, the automated capacity harvest and inventory migration application is particularly useful in assisting network providers better understand the unused capacity within their network, thereby saving hours or even days of tedious manual labor. It also provides a more streamlined inventory migration process as network elements are upgraded and/or replaced.

Network Proact Application:

The network proact application provides a customized list (i.e., a watch list) that includes circuits that have been selected by a user or automatically selected by the system based proactive management measures.

In an embodiment, the network proact application (and other applications described herein) may include user-specified rules that trigger a proactive/remedial action. In another embodiment, the user-defined rule may involve machine learning techniques. For example, a machine learning technique may predict when a network health issue, such as exhaustion available capacity, may occur. In various examples, one of the following machine learning techniques may be applied to the runtime and baseline performance information collected from the ONEs: statistical process control, clustering, isolation forest, signal correlation-based approach, linear regression, classification tree, naive bayes, and others.

Figure 20:
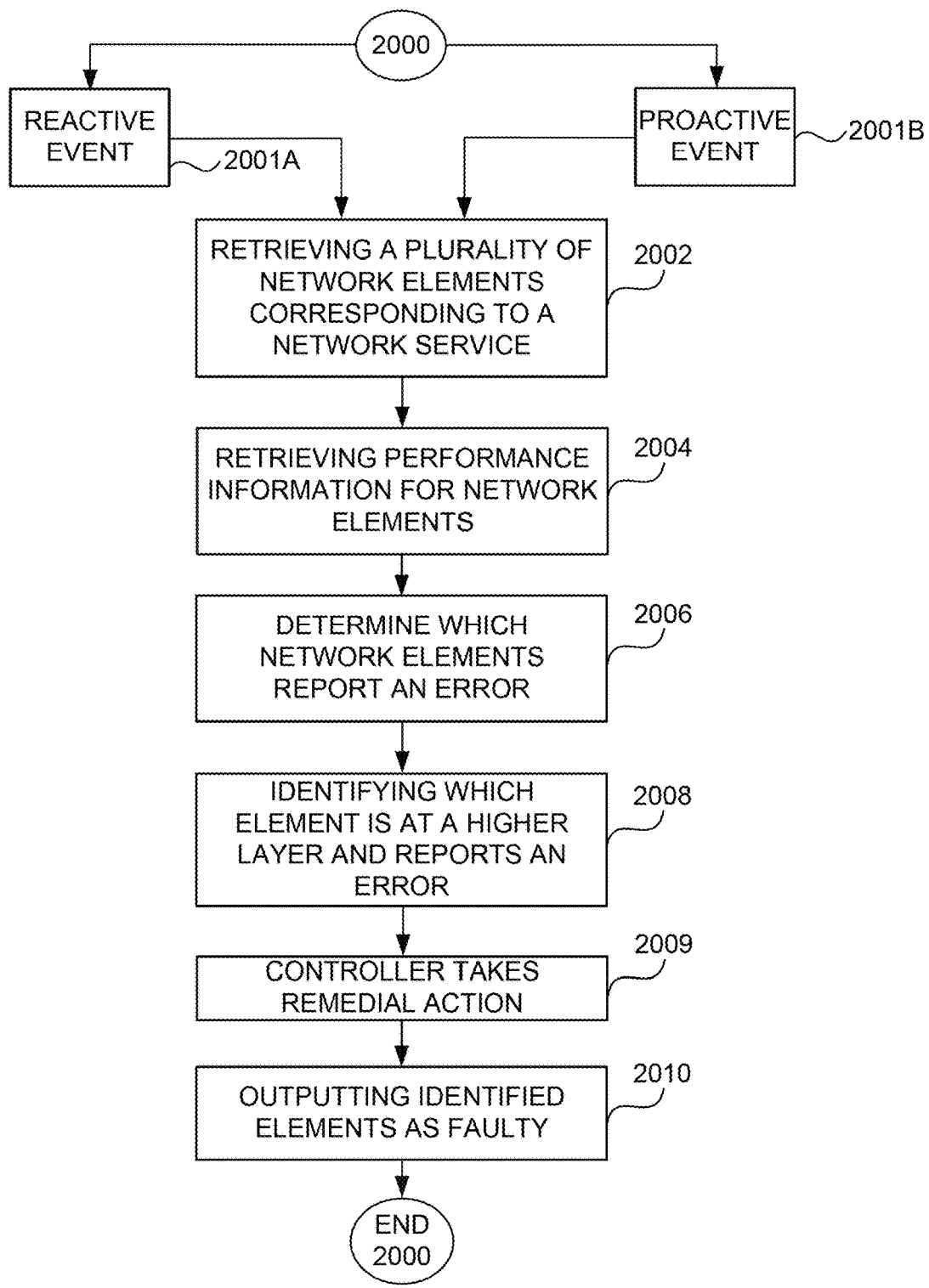
FIG. 20 shows a method for isolating an error in an optical transport network, according to an embodiment.

In an embodiment, when a user-defined rule is met, method 2000, illustrated in FIG. 20, may be triggered to retrieve runtime performance data from the entire end-to-end circuit, including at the wavelength level, and to locate a fault. Based on that data, a remedial action is triggered.

The remedial action may involve alerting, ticketing, or auto remediation. As explained above with respect to the notifications application, alerting may involve sending a notification message (e.g., email, text, automated voice message, visual alarm, audible alarm, vibration alarm, smartphone notification, etc.) to an individual responsible for the network. Alerting may also involve providing information on a customer portal interface, such as the display interfaces illustrated in FIGS. 5, 6A-C, 8A-G, 10, and 13-19A-C. Ticketing may involve creating a trouble ticket for IT personnel to handle. The trouble ticket may be with personnel at a customer site and/or with a vendor who provided the network. Auto remediation may involve steps that attempt to solve the issue, including an auto-detect routine, an auto-test routine, or an auto-fix routine. This could involve ordering more equipment, or licenses to extract more capabilities out of existing equipment, to solve a bandwidth problem for example. It could involve execution of a script on the ONE that attempts to troubleshoot the issue, such as by switching the service to its protection card/path or restarting the port or the network element. The auto remediation could involve isolation of the problem as will be discussed below with respect to FIG. 20 or it may include any of the predetermined or user-specified actions described above. In an embodiment, the remedial action may be configured or specified using the Rules Engine Application described above.

To properly detect a circuit that may trigger a proactive event within the alarms application, proact application or any of the other described applications, isolating an error in an optical transport network may be necessary. FIG. 20 shows an exemplary method 2000 for isolating an error in an optical transport network.

While FIG. 20 describes isolating an error on an OTN, similar methods could be used to isolate errors within other data transport systems.

Method 2000 begins 2001 where either a reactive event begins the process or a proactive event. Reactive events (2001A) are user-defined OTN alarms that have been identified as a problem that needs automated trouble isolation. Proactive events (2001B) are user-defined OTN performance degradations that have been identified as a problem that needs automated trouble isolation. As described above, the user may define that when a performance characteristic, such as light levels, bit error rate (BER), throughput, latency, errored seconds, severely errored seconds, unavailable second, number of coding violations (errors), forward error corrections, uncorrectable block errors, and/or jitter testing, passes a threshold, an alarm should trigger or performance degradations have occurred that needs automated trouble isolation. Once the event has been identified, it moves to step 2002.

At step 2002, the plurality of network elements in the optical transport network that correspond to a network service are identified. The plurality of network elements may be identified by retrieving them from an inventory database, such as inventory database 436 in FIG. 4. Each of the plurality of network elements corresponds to a layer in a network hierarchy of the plurality of network elements, including, for example, at least one particular wavelength of an optic fiber.

At step 2004, performance information is retrieved for each of the plurality of network elements. The performance information may be retrieved by sending queries to the optical network elements identified in step 2002. As described above with respect to FIG. 4, to communicate with the optical network elements, different command sets may be used depending on a type of the network element. The different command sets may be implemented in different resource adapters. Each resource adapter is configured to implement the desire functionality of the controller in one of various network command languages. The network command languages include Transaction Language 1 (TL1), Simple Network Management Protocol (SNMP), command-line interface (CLI), NETCONF/YANG, and other command and control interfaces. In this way, performance information can be retrieved for each of the plurality of network elements.

At step 2006 the retrieved performance information is evaluated determining which network elements from the plurality of network elements report an error in the retrieved performance information. To determine whether an error condition occurs, the retrieved performance information may be compared against a performance baseline and a user-defined rule as described above with respect to FIG. 11. Based on that comparison, the retrieved performance information may be determined to be outside of the normal range, such as a light level that is too low. Using this determination, errors are checked and evaluated along each port utilized in the network service.

At step 2008, the error information is used in identifying which network element of the plurality of network elements likely has failed. To determine which network element in the plurality of network elements has failed, a controller may determine which of the network element is at a lowest layer in an optical network hierarchy that still reports an error. Beyond that layer, the next lower level layer in the network hierarchy may not report an error on other channels. This is illustrated with respect to FIG. 21.

Figure 21:
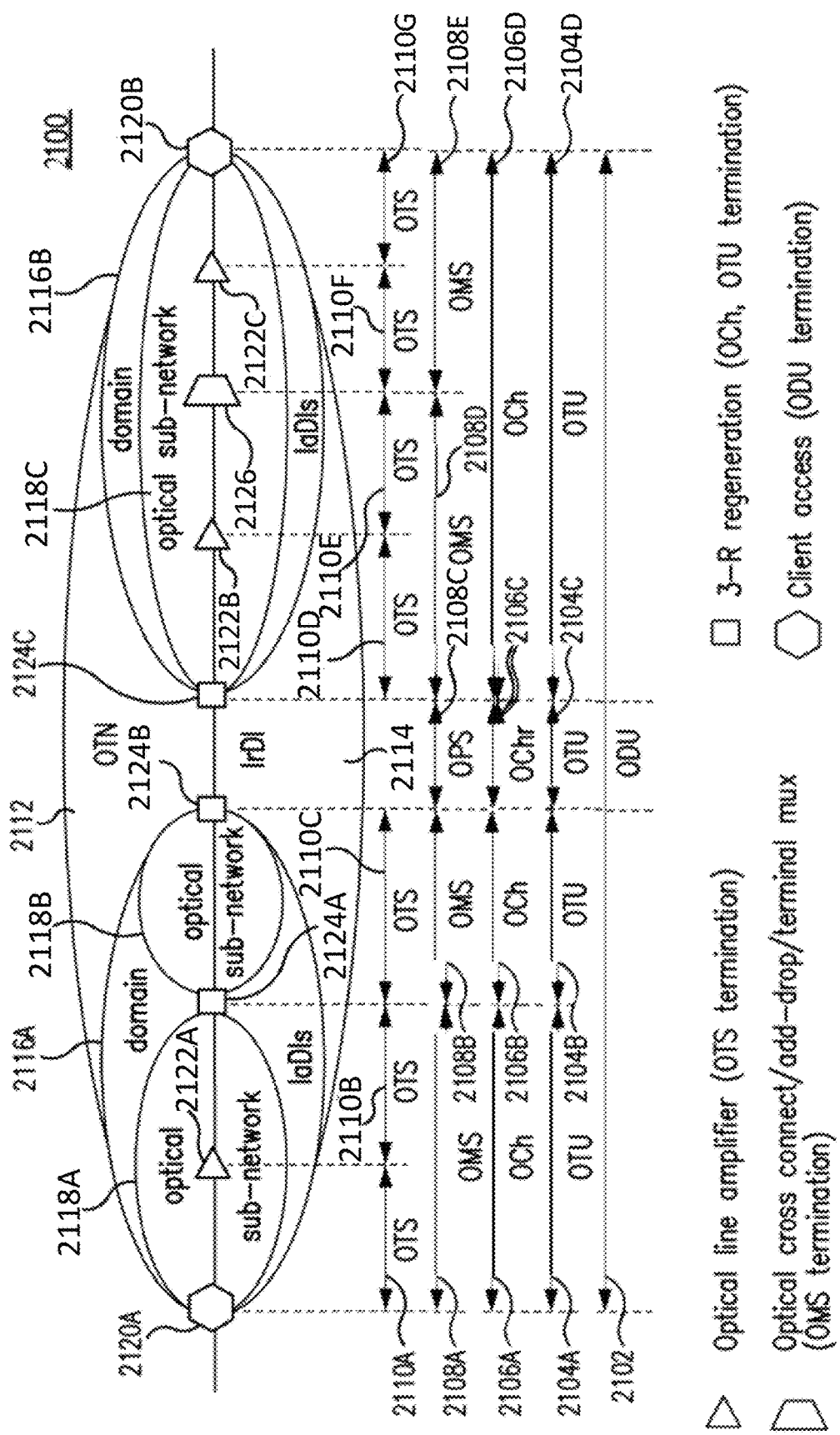
FIG. 21 shows various layers of an optical transport network, according to an embodiment.

While optical transport networks are operated on a physical layer, optical transport networks may have various sublayers as illustrated in FIG. 21. FIG. 21 shows various layers of an optical transport network, according to an embodiment.

FIG. 21 shows a diagram 2100 with an optical transport network 2112 that connects client access points 2120A and 2120B.

Optical transport network 2112 is divided into different sublayer spanning different devices. As the check occurs in step 2008, the sublayers are repeatedly evaluated until the lowest layer in the network hierarchy does not report an error is identified. This may involve repeatedly incrementing a checked layer from a starting layer in the network hierarchy and checking the checked layer to identify if another channel in the checked layer reports an error. A specific example is described below.

First, at a highest layer, an Optical channel Data Unit (ODU) 2102 contains the payload from the network service plus overhead such as bit-interleaved parity 8 (BIP8), general communication channel (GCC) was defined by G.709, and or Tandem Connection Monitoring (TCM) for error correction and management. Optical channel Data Unit 2102 carries the payload from the network service from client endpoint 2120A to client endpoint 2120B, and vice versa.

At a next highest level, Optical Transport Units (OTU) 2104A-D contains the ODU, provides the parity bits such as BIP8, and supports GCC bytes for overhead communication between network nodes. The GCC bytes provide management functions such as performance monitoring, fault detection, and signaling and maintenance commands in support of protection switching, fault sectionalization, service-level reporting, and control plane communications. Each of OTU 2104A-D may correspond to an optical subnetwork or Interdomain interface (IrDI). OTU 2104A spans optical subnetwork 2118A; OTU 2104B spans optical subnetwork 2118B; OTU 2104D spans inter-domain interface 2114; OTU 2104D spans optical subnetwork 2118C.

OTU 2104A-D may contain data from multiple ODUs in addition to ODU 2102. If the various OTU network elements report an error on only ODU 2102 and not the other ODUs within OTU 2104A-D, then the failed devices can be isolated to the client access terminals 2120A-B. Otherwise, if any one of OUT 2104A-D contains errors for all the ODUs it contains, the analysis may continue to the next lower sublayer in the network hierarchy.

The next lower layer in the network hierarchy is an Optical Channel (OCH) that always contains a single OTU. The OTU is mapped into a wavelength of the OCH, which runs across the optical line. OTU 2104A-D correspond to OCH 2106A-D respectively. An OCH always contains at least one OTU. Both span the distance between the various 3R regeneration points 2124A-C and the client access points 2120A-B. So, for the purposes of this analysis, the OTU and OCH analysis may be treated as a common layer.

At a next lower layer, Optical Multiplex Section (OMS) sits between two devices and can multiplex wavelengths onto a fiber. As shown in FIG. 21, OMS 2108A corresponds to OCH 2106A and OTU 2104A, and OMS 2108B corresponds to OCH 2106B and OTU 2104B. A multiplexer 2126 exists on optical subnet 2118C. Thus, OCH 2106D is divided into OMS 2108D and OMS 2108E.

OMS 2108D-E may contain data from multiple OCHs/ OMSes in addition to OCH 2106D/OTU 2104D. If the various OTU network elements report an error on only OCH 2106D/OTU 2104D and not the other OCHs/OMSes within OMS 2108D-E, then the failed devices can be isolated to the client access terminals 2120 B or 3-R regeneration device 2124C. Otherwise, if any one of OMS 2108D-E contains errors for all OCHs/OMSes it contains, the analysis may continue to the next lower sublayer in the network hierarchy.

A next lower sublayer, Optical Transmission Section (OTS) 2110A-G are the fiber between anything that performs an optical function on the signal. An Erbium-Doped Fiber Amplifier (EDFA), such as optical line amplifiers 2122A-C counts as 'line amplifying' equipment. To evaluate OTSs, light levels at each amplifier and optical network element along the path are evaluated to determine where a break in the connection occurs.

Turning to FIG. 20, once the faulty network element is identified at step 2008, the identified network element is output as to indicate that it is possibly faulty (or about to be faulty). At step 2009, a controller, such as 430 in FIG. 4, may take remedial actions. As described above for step 1108, the remedial action may involve alerting, ticketing, or auto remediation. Alerting may involve sending a notification message (e.g., email, text, automated voice message, visual alarm, audible alarm, vibration alarm, smartphone notification, etc.) to an individual responsible for the network. The located problem may be output at step 2010. As described above with respect to FIG. 20, this may involve various remediation actions. This can include alerting, ordering equipment, ticketing, or other preprogrammed remediation tasks as specified by a user.

FIGS. 22 and 22A-E show various example operations to isolate a fault in an optical transport network, according to an embodiment.

Figure 22:
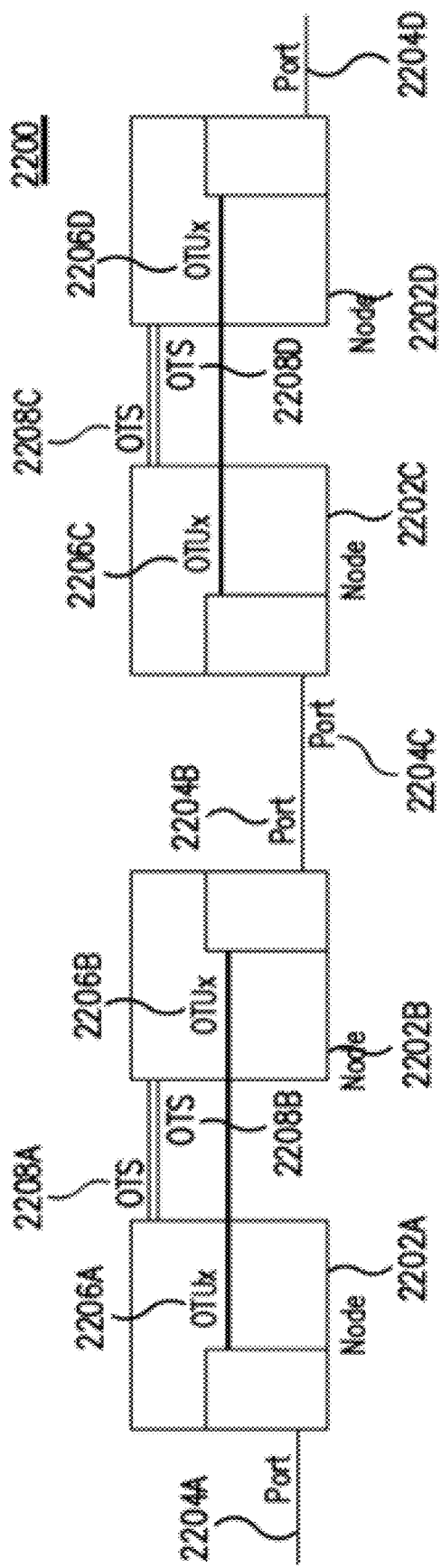
FIG. 22 shows an example of an optical transport network, according to an embodiment.

FIG. 22 illustrates a diagram 2200 with nodes 2202A-D. Each of nodes 2202A-D represents an OTN network elements. Each of nodes 2202A-D includes a respective port 2204A-D. Ports 2204A-D each represent a client signal rate, such as 1GBE, 10GBE, OC192, 100GBE, etc over a particular wavelength of the optical fiber. Port 2204A, on node 2202A, may connect to an A-end of a client service, and Port 2204D, on node 2202D may connect to an Z-end of the client service. Port 2204B, on node 2202B, may connect to an A-end of a client service.

OTU 2206A-D represents interfaces with the OTU signal rate, such as OTU2, OTU3, OTU4, OTUC4, OTUC8, etc. OTU 2206A encapsulates data from port 2204A and transmits to OTU 2206B; OTU 2206B encapsulates data from port 2204B and transmits to OTU 2206A. OTU 2206C encapsulates data from port 2204C and transmits to OTU 2206D; OTU 2206D encapsulates data from port 2204C and transmits to OTU 2206C.

OTS 2208A-D represents interfaces with the OTS signal rate between nodes. OTS 2208A encapsulates data from node 2202A and transmits to OTS 2208B; OTS 2208B encapsulates data from node 2202B and transmits to OTS 2208A. OTS 2208C encapsulates data from node 2202C and transmits to OTS 2208D; OTS 2208D encapsulates data from node 2202D and transmits to OTS 2208C.

FIGS. 22A-E illustrate examples of different faults in the optical transport network of FIG. 22, according to an embodiment. For each, as described above, receive and transmit light levels are checked at each port and line interface in the path of the circuit. Each light level is pass/failed depending on if it is in the acceptable range for that specific hardware or the user-defined specific levels and conditions. When an out of spec receive light level is detected, a controller will identify the port transmitting light towards that receive location and verify if the transmit optical power level is within the acceptable range.

Figure 22A:
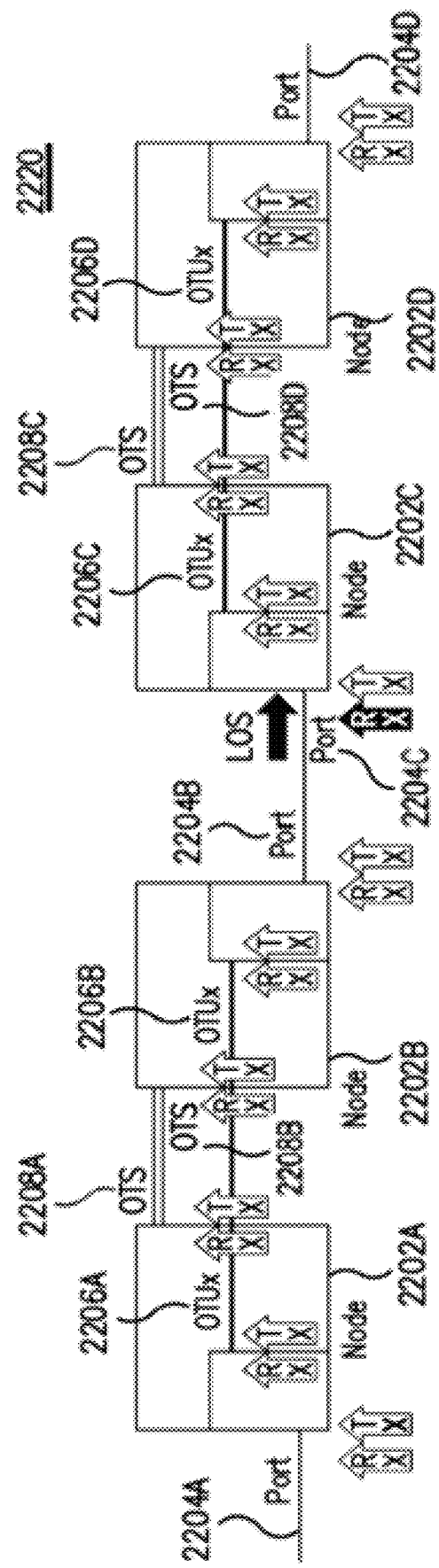

In FIG. 22A, the trouble is isolated between the receive of Port 2204C and the transmit of Port 2204B. This is a one-way issue.

Figure 22B:
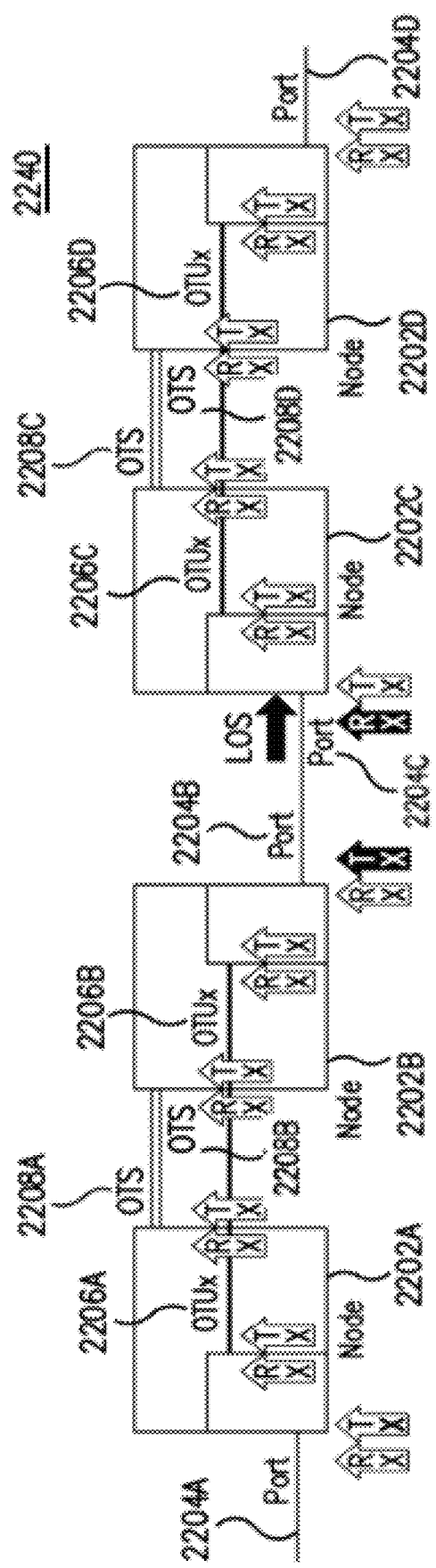

In FIG. 22B, the trouble is isolated to be at the transmit Port 2204B. This is again a one-way issue.

Figure 22C:
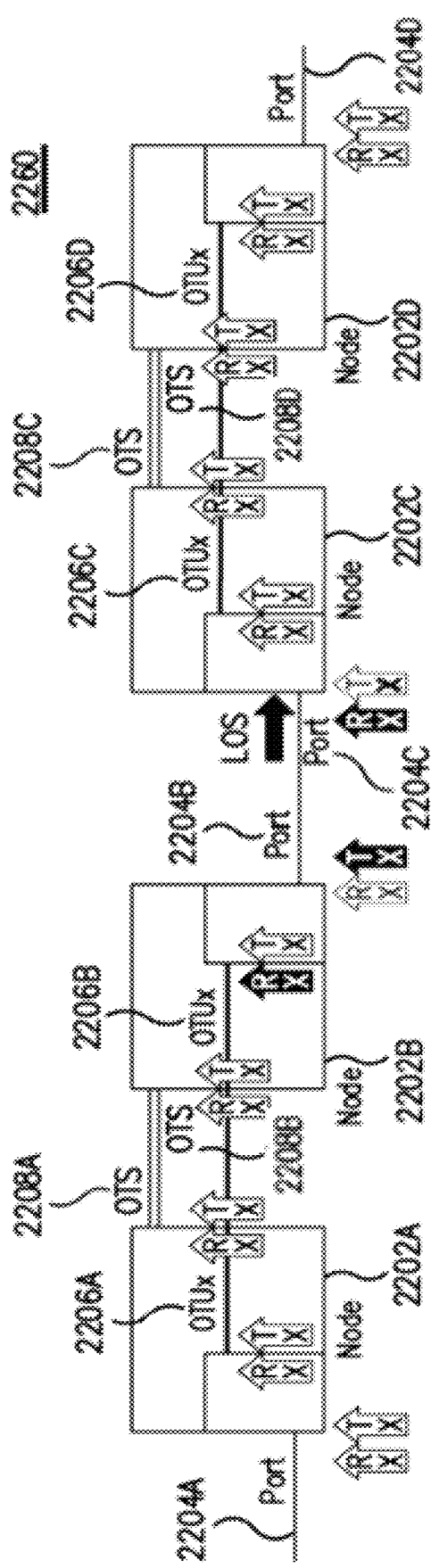

In FIG. 22C, the trouble is isolated to be at the OTUx level at the receive OTUx 2206B location, but not at the OTS level since the aggregate power level is in spec. This is one again a one-way issue.

In FIG. 22D, the trouble is isolated to be between the receive at OTS 2208B and the transmit of OTS 2208A, once again a one-way issue.

In FIG. 22E, the trouble is isolated to be between the receive at OTS 2208A and the receive of OTS 2208B. This is a two-way issue.

A skilled artisan would recognize that the inventory information, for example shown in the figures, could represent physical inventory, logical inventory, or both. In addition, the performance and fault information and other inputs and outputs described herein can be available via APIs, such as Web Services.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

What is claimed is:

1. A method for managing network properties displayed at a user device, comprising:

receiving user credentials at an interface of the user device;

sending the received user credentials to a remote server for validation;

receiving, at the user device, at least one network element property describing at least one of a network element and a network circuit, wherein the at least one network property is selected from a plurality of network element properties and is based at least in part on one or more predetermined settings associated with the validated user credentials, wherein the one or more predetermined settings comprises at least one application selected from a plurality of applications available to a user based on the validated user credentials, and wherein the selected at least one network property is retrieved from an inventory database, a user database, a network management controller, or a combination thereof; and displaying, at the interface of the user device, the received at least one network element property based on at least one predetermined display configuration selected from a plurality of display configurations supported by the at least one application.

2. The method of claim 1, further comprising:

receiving, at the interface of the user device, at least one user-specified display preferences; and updating the at least one predetermined display configuration based on the received user-specified display preference, the received user credentials, the at least one application, or a combination thereof.

3. The method of claim 1, wherein the predetermined display configuration is further determined based on a first default configuration associated with a first job function or task or a second default configuration associated with a second job function or task, wherein the first default configuration and the second default configuration comprise at least one different network element property describing the at least one network element.

4. The method of claim 1, wherein the predetermined display configuration is further determined based at least in part on a job function associated with the validated user credentials.

5. The method of claim 1, wherein the selected at least one network element property is displayed using at least one of an application programming interface, a table format, a graph, an image, a map format, a graphical user interface, or any combination thereof.

6. The method of claim 1, wherein the selected at least one network element property comprises one or more of: a network element ID, a map view of a distributed optical network, a global position, a network location, a table describing a usage, a table describing network elements associated with the at least one entity, optical network system trace information of the at least one wavelength, a switch number, a line identification, a port number, a total bandwidth usage, bandwidth limitations, a light level, a number of packets received, a number of packets sent, an alarm status, circuit analysis data, or a remaining capacity.

7. The method of claim 1, further comprising:

receiving, from the remote server, a notification that the selected at least one network element property satisfies a first user-defined rule; and in response to receiving the notification, setting a predetermined alarm to alert the user that a user-defined rule has been satisfied or automatically changing at least one network setting based on a predetermined setting and updating the interface of the user device to display the changed network setting.

8. The method of claim 7, further comprising:

receiving, at the interface of the user device, at least one user-specified alarm preference or a predetermined action; and updating the predetermined alarm or the predetermined action based on the received user-specified alarm preference or the received predetermined action.

9. The method of claim 8, wherein the predetermined alarm or the predetermined action is at least one of an email, a text message, an audible alarm on the user device or a separate user device, a visual alarm on the user device or a separate user device, a vibration alarm on the user device or a separate user device, an external API message, a control-loop interaction with the network to automate a network change, or any combination thereof.

10. The method of claim 1, wherein the user device is at least one of a computer, a tablet, a smartphone, a gaming system, a smart watch, a television, an augmented reality device, a virtual reality device, or any other application-enabled platform.

11. The method of claim 1, wherein the at least one network element resides in at least one of: an optical network, 5G network, wavelength-division multiplexing (WDM) network, optical transport network (OTN), data center interconnect (DCI) network, synchronous optical network (SONET), Ethernet, virtual private network (VPN), and software-defined networking in a wide area network (SD-WAN), or any combination thereof.

12. The method of claim 1, further comprising:

receiving, from the remote server, a live video feed of the at least one network element;

receiving, at the interface of the user device, an identification of at least one portion of the at least one network element in need of repair; and transmitting the received identification to the remote server.

13. A method for managing network properties at a system server, comprising:

(a) receiving user credentials from a remote user device;

(b) validating the received user credentials;

(c) retrieving, from a user database, at least one network service provided to an account associated with the received user credentials;

(d) retrieving, from an inventory database, properties describing at least one of a network element and a network circuit;

(e) retrieving, from a network management controller, the properties of the at least one of the network element and the network circuit retrieved in (d) based at least in part on the at least one network service retrieved in (c);

(f) selecting at least one of the properties received in (e) based at least in part on one or more predetermined settings associated with the user credentials validated in (b), wherein the one or more predetermined settings comprises at least one application selected from a plurality of applications available to a user based on the validated user credentials; and (g) sending, to the remote user device, the at least one of the properties selected in (f).

14. The method of claim 13, further comprising:

receiving, from the remote user device, at least one user-specified setting; and updating the one or more predetermined settings associated with the user credentials based on the received at least one user-specified setting, the received user credentials, the at least one application, or a combination thereof.

15. The method of claim 13, wherein the one or more predetermined settings are determined based on a default configuration, a predetermined user-specified setting, the at least one application, or a combination thereof.

16. The method of claim 13, wherein the one or more predetermined settings are further determined based at least in part on a job function associated with the validated user credentials.

17. The method of claim 13, wherein the selected at least one network element property comprises: a network element ID, a map view of a distributed optical network, a global position, a network location, a table describing a usage, a table describing network elements associated with the at least one entity, optical network system trace information of the at least one wavelength, a switch number, a line identification, a port number, a total bandwidth usage, bandwidth limitations, a light level, a number of packets received, a number of packets sent, an alarm status, circuit analysis data, a remaining capacity, or any combination thereof.

18. The method of claim 13, wherein the at least one network element resides in at least one of: an optical network, 5G network, wavelength-division multiplexing (WDM) network, optical transport network (OTN), data center interconnect (DCI) network, synchronous optical network (SONET), Ethernet, virtual private network (VPN), and software-defined networking in a wide area network (SD-WAN), or any combination thereof.

19. The method of claim 13, further comprising:
transmitting, to the remote user device, a live video feed of the at least one network element;
receiving, from the remote user device, an identification of at least one portion of the at least one network element in need of repair; and
transmitting the received identification to an augmented reality device, a virtual reality device, a remote device operating a conferencing platform, or any combination thereof.

20. A personalized remote network management system, comprising:
a network management controller electronically coupled to a network apparatus;
an inventory database configured to store data specifying how the network apparatus provides a network service;
a user database that specifies which user is provided the network service; and
a personalized data processing system, implemented by a system server coupled to the network management controller, the inventory database, and the user database, the personalized data processing system comprising:
an authentication component configured to authenticate user credentials and determine user access privileges;
a property extractor component, configured to select at least a portion of the data received from the network management controller based on one or more of the user access privileges and at least one application selected from a plurality of applications available to the user based on the validated user credentials;
an interface configured to display the data selected by the property extractor component based on at least one predetermined display configuration selected from a plurality of display configurations supported by the at least one application; and
an interface component that is added or removed via the interface based on at least one of a predetermined configuration or a user preference.

* * * * *